United States Patent
Tanigawa et al.

(10) Patent No.: US 10,817,751 B2
(45) Date of Patent: Oct. 27, 2020

(54) LEARNING DATA CREATION METHOD, LEARNING METHOD, RISK PREDICTION METHOD, LEARNING DATA CREATION DEVICE, LEARNING DEVICE, RISK PREDICTION DEVICE, AND RECORDING MEDIUM

(71) Applicant: Panasonic Intellectual Property Corporation of America, Torrance, CA (US)

(72) Inventors: Toru Tanigawa, Osaka (JP); Yukie Shoda, Osaka (JP); Junichi Imoto, Osaka (JP); Yusuke Tsukamoto, Osaka (JP); Seiya Imomoto, Hyogo (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 42 days.

(21) Appl. No.: 16/366,294

(22) Filed: Mar. 27, 2019

(65) Prior Publication Data
US 2019/0303718 A1 Oct. 3, 2019

(30) Foreign Application Priority Data
Mar. 30, 2018 (JP) .................. 2018-067882

(51) Int. Cl.
*G06K 9/62* (2006.01)
*G06K 9/00* (2006.01)
(Continued)

(52) U.S. Cl.
CPC ....... *G06K 9/6256* (2013.01); *G06K 9/00744* (2013.01); *G06K 9/00805* (2013.01);
(Continued)

(58) Field of Classification Search
CPC ............. G06K 9/6256; G06K 9/00744; G06K 9/00805; G06K 9/6268;
(Continued)

(56) References Cited

U.S. PATENT DOCUMENTS 10,620,317 B1* 4/2020 Chai ...................... G01S 17/89
2017/0248950 A1* 8/2017 Moran ................. G05D 1/0055
(Continued)

FOREIGN PATENT DOCUMENTS

| JP | 2014-35639 | 2/2014 |
| JP | 6045846 | 12/2016 |
| JP | 2017-138694 | 8/2017 |

*Primary Examiner* — Ali Bayat
(74) *Attorney, Agent, or Firm* — Wenderoth, Lind & Ponack, L.L.P.

(57) ABSTRACT

A learning data creation method acquires items of still image data or moving image data as event data and non-event data, presents first data that is still image data or moving image data that is of a predetermined time before an event and included in the event data and still image data or moving image data, presents non-event data as second data, receives a judgment result as to whether the first data and second data are similar, (a) stores the event data as positive data, (b) stores the non-event data as positive data if the first data and second data are similar, and (c) stores the non-event data as negative data if the first data and second data are not similar.

24 Claims, 15 Drawing Sheets

(51) Int. Cl.
*G08G 1/16* (2006.01)
*G05D 1/02* (2020.01)

(52) U.S. Cl.
CPC ........... *G06K 9/6268* (2013.01); *G08G 1/162* (2013.01); *G05D 1/0221* (2013.01); *G05D 1/0231* (2013.01); *G06K 2009/00738* (2013.01)

(58) Field of Classification Search
CPC ......... G06K 2009/00738; G08G 1/162; G05D 1/0221; G05D 1/0231; G05D 1/0276; G05D 1/0055; B60W 30/09
USPC .......................................................... 382/104
See application file for complete search history.

(56) References Cited

U.S. PATENT DOCUMENTS

| | | |
|---|---|---|
| 2018/0357484 A1 | 12/2018 | Omata |
| 2019/0004528 A1* | 1/2019 | Zhan .................... G05D 1/0221 |
| 2019/0265703 A1* | 8/2019 | Hicok ................... G05B 13/027 |
| 2019/0265712 A1* | 8/2019 | Satzoda ............... B60W 40/09 |
| 2019/0310654 A1* | 10/2019 | Halder ................. G05D 1/0088 |

* cited by examiner

LEARNING DATA CREATION METHOD, LEARNING METHOD, RISK PREDICTION METHOD, LEARNING DATA CREATION DEVICE, LEARNING DEVICE, RISK PREDICTION DEVICE, AND RECORDING MEDIUM

CROSS REFERENCE TO RELATED APPLICATION

This application claims the benefit of priority of Japanese Patent Application Number 2018-067882 filed on Mar. 30, 2018, the entire content of which is hereby incorporated by reference.

BACKGROUND

1. Technical Field

The present disclosure relates to a learning data creation method, learning method, risk prediction method, leaning data creation device, learning device, risk prediction device, and recording medium.

2. Description of the Related Art

Driving support technology for automobiles and self-driving technology are being developed. These technologies require techniques that photograph surroundings of a vehicle with an onboard camera, recognize an object around the vehicle, and detect a moving body which may be an obstacle to travel of the vehicle. In order to recognize an object around the vehicle, machine learning (also simply referred to as learning) can be used.

Japanese Unexamined Patent Application Publication No. 2017-138694 discloses a technique that records or extracts a trouble video or the like from a video captured with an onboard camera based on features of a trouble video (also referred to as an accident video) or a video of when there was a possibility of leading to a trouble although it did not lead to a trouble as a result (also referred to as an incident video, and also generally referred to as a close call video or near miss video).

SUMMARY

However, the technique disclosed in Japanese Unexamined Patent Application Publication No. 2017-138694 distinguishes a trouble video or the like based on features of an accident video or incident video. Therefore, there is a problem that it is impossible to predict risk events including an accident or incident that will occur in the future before the accident or incident occurs.

Therefore, the present disclosure provides a learning data creation method or the like for appropriately predicting risk events including an accident or incident that will occur in the future.

A learning data creation method according to an aspect of the present disclosure is a learning data creation method for creating, by a computer, learning data for risk prediction including positive data and negative data, and includes: acquiring one of items of still image data and items of moving image data as items of event data in each of which an event that is one of an accident and an incident appears and items of non-event data in each of which no event appears; presenting first data which is one of still image data and moving image data that is of a predetermined time before the event and included in one item of event data of the items of event data acquired; presenting one item of non-event data of the items of non-event data acquired, as second data; receiving a judgment result as to whether the first data and the second data are similar; and storing the event data and the non-event data in a storage device to create the learning data, wherein in the storing: (a) the event data is stored as the positive data; (b) the non-event data is stored as the positive data if the judgment result received indicates that the first data and the second data are similar; and (c) the non-event data is stored as the negative data if the judgment result received indicates that the first data and the second data are not similar.

It should be noted that the generic or specific aspects may be implemented as a system, an apparatus, an integrated circuit, a computer program, or a computer-readable recording medium such as a CD-ROM, and may be implemented by any combination of a system, an apparatus, an integrated circuit, a computer program, or a computer-readable recording medium.

The learning data creation method of the present disclosure can appropriately predict risk events including an accident or incident that will occur in the future.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

DETAILED DESCRIPTION OF THE EMBODIMENT

Figure 1:
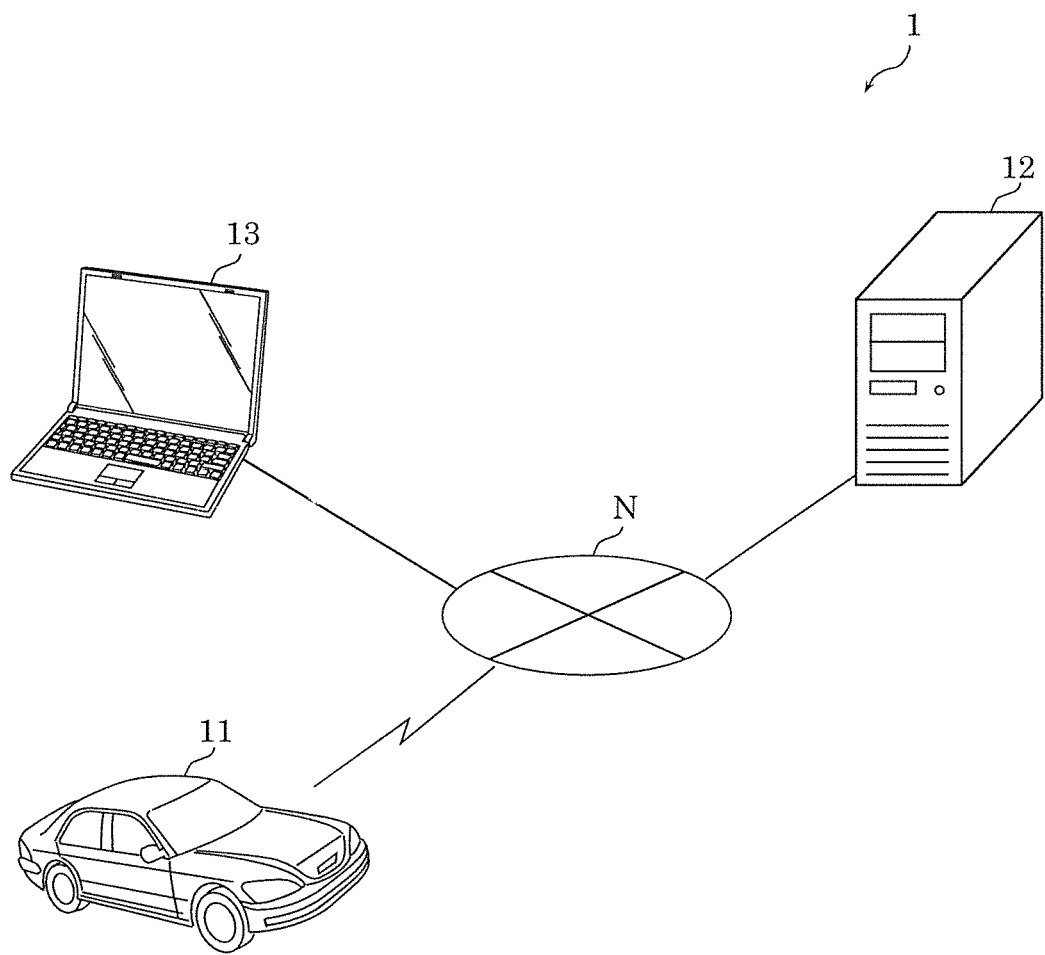
FIG. 1 is a diagram illustrating a configuration of a risk prediction system in an embodiment.

A learning data creation method according to an aspect of the present disclosure is a learning data creation method for creating, by a computer, learning data for risk prediction including positive data and negative data, and includes: acquiring one of items of still image data and items of moving image data as items of event data in each of which an event that is one of an accident and an incident appears and items of non-event data in each of which no event appears; presenting first data which is one of still image data and moving image data that is of a predetermined time before the event and included in one item of event data of the items of event data acquired; presenting one item of non-event data of the items of non-event data acquired, as second data; receiving a judgment result as to whether the first data and the second data are similar; and storing the event data and the non-event data in a storage device to create the learning data, wherein in the storing: (a) the event data is stored as the positive data; (b) the non-event data is stored as the positive data if the judgment result received indicates that the first data and the second data are similar; and (c) the non-event data is stored as the negative data if the judgment result received indicates that the first data and the second data are not similar.

According to the above aspect, the data similar to the event data of the non-event data is used for learning as positive data. In the related art, because non-event data is uniformly used for learning as negative data, data similar to event data of non-event data is used for learning as negative data. In that case, if one of the event data and the non-event data that are similar to each other is learned as positive data, and the other is learned as the negative data, a recognition model generated by learning may become inappropriate. Therefore, when the event data and the non-event data are similar to each other, by learning both as the positive data, it is possible to avoid the recognition model becoming inappropriate, and obtain the appropriate recognition model. According to a learning data creation method according to one aspect of the present disclosure, by learning based on the learning data created in this way, it is possible to appropriately predict risk events including an accident or incident that will occur in the future.

For example, the predetermined time may be determined based on a reaction time which is a time from when a driver of a vehicle recognizes a danger to when the driver takes braking measures for the vehicle.

According to the above aspect, by using the reaction time as the predetermined time, it is possible to appropriately predict risk events including an accident or incident that will occur in the future more easily.

For example, the predetermined time may be determined further based on a processing time of a risk prevention device that performs processing of the risk prediction.

According to the above aspect, by using the reaction time and the processing time of the risk prediction device as the predetermined time, it is possible to appropriately predict risk events including an accident or incident that will occur in the future more easily.

For example, each of the items of event data may be moving image data, and each of the items of non-event data may be moving image data.

According to the above aspect, by creating the learning data using the moving image data as the event data and the non-event data, it is possible to more accurately learn features of the event data and features of the non-event data. As a result, it is possible to appropriately predict risk events including an accident or incident that will occur in the future.

For example, the first data may be moving image data.

According to the above aspect, by using the moving image data as the first data, it is possible to more accurately make a similarity judgment with second data which is the non-event data. As a result, it is possible to appropriately predict risk events including an accident or incident that will occur in the future.

For example, in the receiving, a judgment result as to whether an event actually appears in the event data may be further received; and in the storing, the event data may be stored as the negative data if the judgment result received indicates that no event actually appears in the event data.

According to the above aspect, the event data in which it is determined that no event actually appears is learned as the negative data. This can make the recognition model more appropriate, and as a result, it is possible to appropriately predict risk events including an accident or incident that will occur in the future.

For example, in the receiving, a judgment result by image recognition processing as to whether the first data and the second data are similar may be received.

According to the above aspect, the similarity judgment between a first image and a second image is automatically made by image recognition processing. This can make the similarity judgment in accordance with certain standards without manual intervention. As a result, it is possible to appropriately predict risk events including an accident or incident that will occur in the future.

For example, the image recognition processing may include processing of recognizing at least one of a total number, a positional relationship, and an optical flow of moving bodies appearing in an image shown by the first data and the second data.

According to the above aspect, by recognizing the number, the positional relationship, or the optical flow of moving bodies as image recognition processing, it is possible to appropriately predict risk events such as an accident or incident that will occur in the future based on more specific recognition processing.

For example, the learning data creation method may further include classifying each item of one of the items of still image data and the items of moving image data generated by photographing with an onboard sensor installed on a vehicle into one of event data and non-event data to acquire the items of event data and the items of non-event data, wherein in the classifying, if one of an event in which a body collides with the vehicle and an event in which a body suddenly comes close is recognized by image recognition processing when one item of one of the still image data and the moving image data is captured by the onboard sensor, the one item of the one of the still image data and the moving image data may be classified into event data.

According to the above aspect, it is possible to obtain the event data and the non-event data by classifying images obtained by the onboard sensor, and further classifying the event data based on collision of a body (for example, another vehicle, a person, etc.) with the vehicle or a body suddenly coming close. By more easily classifying the still image data or the moving image data obtained by the onboard sensor into the event data in this way, as a result, it is possible to appropriately predict risk events including an accident or incident that will occur in the future.

For example, in the classifying, if one of an event in which sudden braking is applied in the vehicle and an event in which sudden steering is performed in the vehicle is determined from acceleration data of the vehicle when the one item of the one of the still image data and the moving image data is captured by the onboard sensor, the one item of the one of the still image data and the moving image data may be classified into event data.

According to the above aspect, the event data can be classified based on sudden braking or sudden steering in the vehicle. By more easily classifying the still image data or the moving image data obtained by the onboard sensor into the event data in this way, as a result, it is possible to appropriately predict risk events including an accident or incident that will occur in the future.

For example, in the classifying, when the vehicle receives a danger signal by inter-vehicle communication even if one of an event in which sudden braking is applied in the vehicle and an event in which sudden steering is performed in the vehicle is determined, the one item of the one of the still image data and the moving image data may be classified into non-event data.

According to the above aspect, an image is classified into the non-event data if the danger signal is received by the inter-vehicle communication. This is for excluding still image data or moving image data from a learning object because there is a possibility of being unable to obtain information on risk prediction from the still image data or moving image data, if the danger signal is received by the inter-vehicle communication, even if sudden braking is applied or sudden steering is performed in the vehicle.

For example, the one item of the one of the still image data and the moving image data may be one of wide-angle still image data and wide-angle moving image data in which a view ahead of the vehicle appears, and in the classifying, if it is determined from acceleration data of the vehicle that sudden braking is applied in the vehicle when the one of the wide-angle still image data and the wide-angle moving image data which is the one item of the one of the still image data and the moving image data is captured by the onboard sensor, one of still image data and moving image data in which the view ahead of the vehicle appears, out of the wide-angle still image data and the wide-angle moving image data, may be classified into event data.

According to the above aspect, when sudden braking in the vehicle is applied, the still image data or the moving image data including a travel direction of the vehicle included in the wide-angle still image data or moving image data is classified into the event data. When sudden braking is applied, there is a possibility that some object or the like may exist in the travel direction of the vehicle. Therefore, by learning the direction of the object as the event data, it is possible to appropriately learn and predict a risk event.

For example, the one item of the one of the still image data and the moving image data may be one of wide-angle still image data and wide-angle moving image data in which a view ahead of the vehicle appears, and in the classifying, if it is determined from acceleration data of the vehicle that sudden steering to one of left and right of the vehicle is performed when the wide-angle still image data and the wide-angle moving image data which is the one item of the one of the still image data and the moving image data is captured by the onboard sensor, one of still image data and moving image data in which the other of the left and right of the vehicle appears, out of the wide-angle still image data and the wide-angle moving image data, may be classified into event data.

According to the above aspect, the still image data or the moving image data including an opposite direction from a direction of sudden steering included in the wide-angle still image data or moving image data is classified into the event data. When sudden steering is performed, there is a possibility that some object or the like may exist in the direction opposite from the direction of steering. Therefore, by learning the direction of the object as the event data, it is possible to appropriately learn and predict a risk event.

For example, in the classifying, a horizontal size of one of the still image data and the moving image data classified into the event data out of the wide-angle still image data and the wide-angle moving image data may be determined based on speed of the vehicle when the one image is captured.

According to the above aspect, a horizontal width of an image to be made into the event data can be adjusted in accordance with a width of a driver's field of view which varies according to speed of the vehicle. Therefore, it is possible to appropriately learn and predict a risk event by using the still image data or the moving image data of which width changes based on a change in the width of the field of view of the driver in the vehicle as the event data.

For example, in the classifying, a horizontal size of one of the still image data and the moving image data classified into the event data out of the wide-angle still image data and the wide-angle moving image data may be smaller as speed of the vehicle when the one image is captured is higher.

According to the above aspect, the horizontal width of an image to be made into the event data can be adjusted in accordance with the width of the driver's field of view which varies according to speed of the vehicle. It is because, generally, if speed of the vehicle is high, the field of view of the driver in the vehicle becomes narrower, and an event is included in the narrowed field of view. Therefore, in consideration of a fact that the field of view of the driver in the vehicle becomes narrower as speed of the vehicle is higher, it is possible to appropriately learn and predict a risk event by using the still image data or the moving image data of which horizontal width changes as the event data.

For example, in the presenting of the second data, the one item of non-event data may be preselected based on image recognition processing from the items of non-event data acquired to present the one item of non-event data selected.

According to the above aspect, it is possible to select an appropriate second image to be presented to the user based on image recognition processing. This allows the user to make the similarity judgment between the first image and the second image more appropriately, and makes it possible to appropriately predict risk events including an accident or incident that will occur in the future.

Furthermore, a learning method according to an aspect of the present disclosure is a learning method for risk prediction by a risk prediction device, and includes: acquiring learning data created according to the above-described learning data creation method; and learning features of the positive data and the negative data included in the learning data based on the learning data acquired, to construct a recognition model.

According to the above aspect, it is possible to appropriately construct the recognition model by using the learning data created according to the learning data creation method, and appropriately predict risk events including an accident or incident that will occur in the future.

Furthermore, a risk prediction method according to an aspect of the present disclosure includes: acquiring one of still image data and moving image data captured by an onboard sensor installed on a vehicle; and outputting prediction information on occurrence of an event after time when the one of the still image data and the moving image data is captured, the prediction information being output by entering the one of the still image data and the moving image data acquired as input data into the recognition model constructed according to the above-described learning method.

According to the above aspect, by using the constructed recognition model, it is possible to appropriately predict risk events including an accident or incident that will occur in the future.

Furthermore, a learning data creation device according to an aspect of the present disclosure is a learning data creation device for creating, by a computer, learning data for risk prediction including positive data and negative data, and includes: a learning data acquirer that acquires one of items of still image data and items moving image data as items of event data in each of which an event that is one of an accident and an incident appears and items of non-event data in each of which no event appears; and an annotation provider that presents first data that is one of still image data and moving image data that is of a predetermined time before an event and included in one item of event data of the items of event data acquired, presents one item of non-event data of the items of non-event data acquired, as second data, receives a judgment result as to whether the first data and the second data are similar, and stores the first data and the second data in a storage device to create the learning data, wherein the annotation provider, during the storing, (a) stores the event data as the positive data, (b) stores the non-event data as the positive data if the judgment result received indicates that the first data and the second data are similar, and (c) stores the non-event data as the negative data if the judgment result received indicates that the first data and the second data are not similar.

The above aspect can achieve the same effect as the learning data creation method.

Furthermore, a learning device according to an aspect of the present disclosure is a learning device for risk prediction by a risk prediction device, and includes: a learning data acquirer that acquires learning data created by the above-described learning data creation device; and a learner that learns features of each of the positive data and the negative data included in the learning data by using the learning data acquired, to construct a recognition model.

The above aspect can achieve the same effect as the learning method.

Furthermore, a risk prediction device according to an aspect of the present disclosure includes: a photographic image acquirer that acquires one of still image data and moving image data captured by an onboard sensor installed on a vehicle; and a recognizer that outputs prediction information on occurrence of an event after time when the one of the still image data and the moving image data is captured, the prediction information being output by entering the one of the still image data and the moving image data acquired, as input data, into the recognition model constructed by the above-described learning device.

The above aspect can achieve the same effect as the risk prediction method.

Furthermore, a recording medium according to an aspect of the present disclosure is non-transitory computer-readable recording medium having a computer program recorded thereon for causing the computer to execute the above-described learning data creation method.

The above aspect can achieve the same effect as the learning method.

Furthermore, a recording medium according to an aspect of the present disclosure is a non-transitory computer-readable recording medium having a computer program recorded thereon for causing the computer to execute the above-described learning method.

The above aspect can achieve the same effect as the learning data creation method.

Furthermore, a recording medium according to an aspect of the present disclosure is a non-transitory computer-readable recording medium having a computer program recorded thereon for causing the computer to execute the above-described risk prediction method.

The above aspect can achieve the same effect as the risk prediction method.

It should be noted that these general or specific aspects may be implemented as a system, an apparatus, an integrated circuit, a computer program, or a computer-readable recording medium such as a CD-ROM, and may be implemented by any combination of a system, an apparatus, an integrated circuit, a computer program, or a computer-readable recording medium.

Hereinafter, specific description of exemplary embodiments will be carried out with reference to the drawings.

The numerical values, shapes, materials, structural components, the arrangement and connection of the structural components, steps, the processing order of the steps, etc. shown in the following exemplary embodiments are mere examples, and are not intended to limit the scope of the present invention. Furthermore, among the structural components in the following exemplary embodiments, components not recited in any one of the independent claims which indicate the broadest concepts of the present invention are described as optional structural components.

Embodiment

In this embodiment, description will be made on a learning data creation method, learning method, risk prediction method, and the like that can appropriately predict risk events including an accident or incident that will occur in the future.

Figure 2:
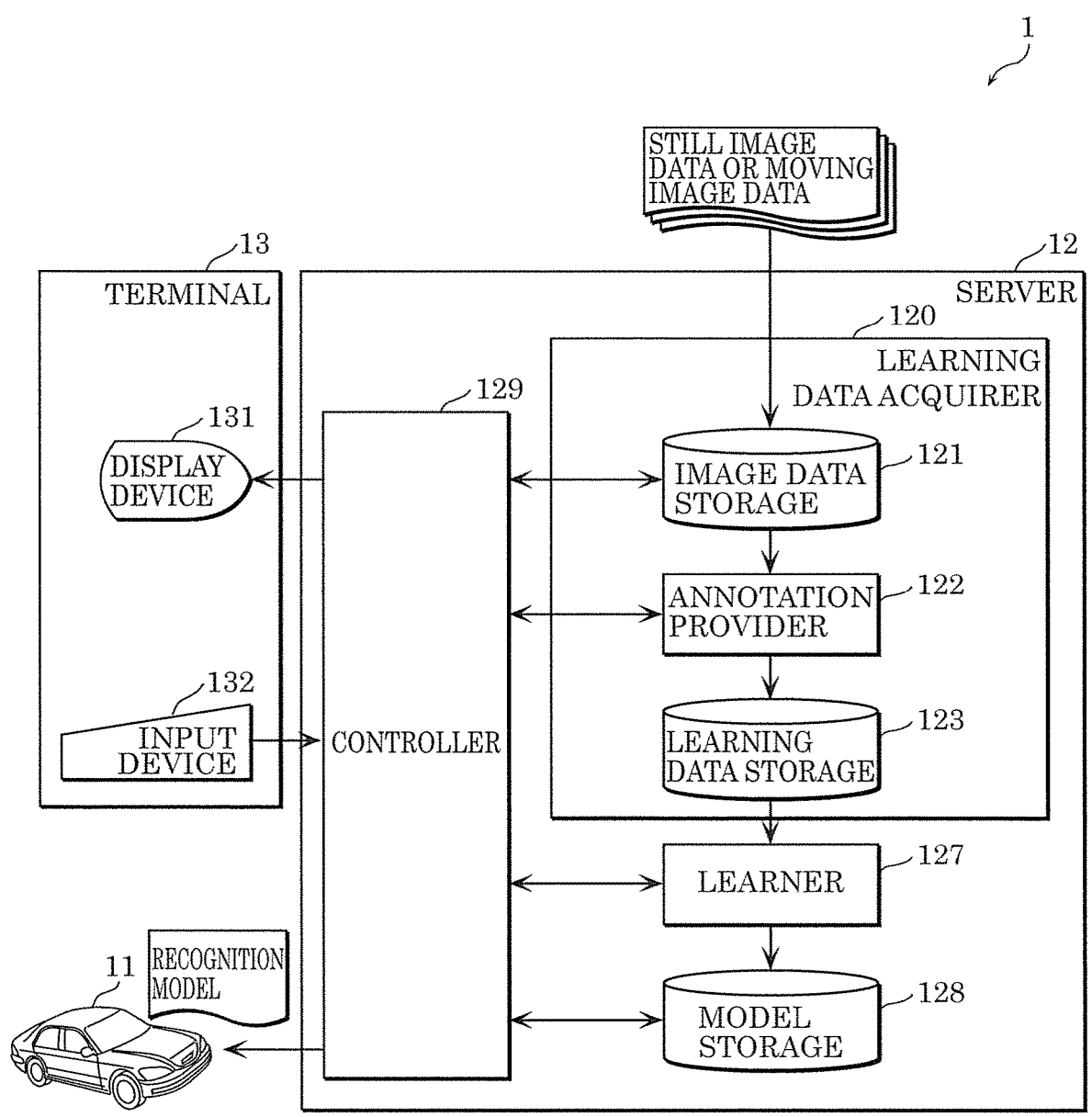
FIG. 2 is a block diagram illustrating a functional configuration of the risk prediction system in the embodiment.

FIG. 1 is a block diagram illustrating a configuration of risk prediction system 1 in the embodiment. FIG. 2 is a block diagram illustrating a functional configuration of risk prediction system 1 in the embodiment.

Risk prediction system 1 in the embodiment is a system that predicts whether an event that is a risk event such as an accident or incident will occur to vehicle 11 in the future. Here, "future" means, for example, future within about 10 seconds to 20 seconds, but not limited to this time.

As shown in FIGS. 1 and 2, risk prediction system 1 includes vehicle 11, server 12, and terminal 13, and they are connected with each other via network N such as the Internet.

Onboard equipment of vehicle 11 includes a camera, and generates an image taken with the camera. Then, the onboard equipment predicts whether an event will occur in the future, that is, makes a risk prediction, based on the image. The risk prediction by the onboard equipment is made based on recognition using a recognition model. The recognition model used for recognition is acquired from server 12 via network N.

Server 12 constructs the recognition model by using items of the still image data or moving image data for learning (also simply referred to as still image data or moving image data). Server 12 acquires and stores the items of the still image data or moving image data. Learning images acquired by server 12 are images taken with the camera of vehicle 11 or a vehicle other than vehicle 11. Server 12 receives the still image data or moving image data obtained in this way via network N.

Server 12 then uses the still image data or moving image data transmitted like this, learns whether an event will occur in the future based on a photographing object appearing in the still image data or moving image data, and thereby constructs the recognition model. Then, server 12 transmits the constructed recognition model to vehicle 11 via network N.

Terminal 13 is a terminal that, for server 12 to construct the recognition model, presents the still image data or moving image data to a user and accepts an input of a result such as a similarity judgment by the user of the presented still image data or moving image data. Terminal 13 includes display device 131 that presents the learning image or the like to the user and input device 132 that accepts the input such as the result of the similarity judgment of the learning image from the user. Display device 131 is a liquid crystal display or an organic EL (electroluminescence) display. Input device 132 is a keyboard, mouse, touch panel, or the like.

The functional configuration of server 12 will be described in detail with reference to FIG. 2.

As shown in FIG. 2, server 12 includes learning data acquirer 120, learner 127, model storage 128, and controller 129. Learning data acquirer 120 includes image data storage 121, annotation provider 122, and learning data storage 123. Server 12 or learning data acquirer 120 corresponds to a learning data creation device for creating learning data for the risk prediction including positive data and negative data by a computer.

Learning data acquirer 120 acquires the learning data used for learning of the risk prediction. Learning data acquirer 120 acquires, for example, the moving image data having a predetermined time length as the still image data or moving image data. The predetermined time length is, for example, 20 seconds.

Learning data acquirer 120 acquires the items of the still image data or moving image data as the items of the event data which are the items of the still image data or moving image data in each item of which an event that is an accident or incident appears, and as items of non-event data which are the items of the still image data or moving image data in each item of which no event appears. Furthermore, the items of the event data may be the moving image data. Also, the items of the non-event data may be the moving image data.

The items of the event data and the items of the non-event data acquired by learning data acquirer 120 are generated, for example, by repeating multiple times a process of classifying one item of the still image data or moving image data into the event data or non-event data, wherein the one item of the still image data or moving image data is generated by photographing with an onboard sensor (for example, the camera) provided on the vehicle. The classifying is performed by, for example, an image processing device provided on the vehicle. In this case, when the onboard sensor generates the still image data or moving image data by photographing, the image processing device classifies it based on the still image data or moving image data, or information obtained by another onboard sensor (for example, an acceleration sensor) provided on the vehicle.

For example, in the above-described classifying, if one of an event in which a body collides with the vehicle and an event in which a body suddenly comes close is recognized by image recognition processing when one item of one of the still image data and the moving image data is captured by the onboard sensor, the one item of the one of the still image data and the moving image data may be classified into event data.

For example, in the above-described classifying, if one of an event in which sudden braking is applied in the vehicle and an event in which sudden steering is performed in the vehicle is determined from acceleration data of the vehicle when the one item of the one of the still image data and the moving image data is captured by the onboard sensor, the one item of the one of the still image data and the moving image data may be classified into event data.

For example, in the above-described classifying, when the vehicle receives a danger signal by inter-vehicle communication even if one of an event in which sudden braking is applied in the vehicle and an event in which sudden steering is performed in the vehicle is determined, the one item of the one of the still image data and the moving image data may be classified into non-event data. Here, a danger signal is, for example, a signal for notifying a danger of vehicular collision that is received from a vehicle located in the vicinity of the vehicle.

For example, in the above-described classifying, in the case where the one item of the one of the still image data and the moving image data is one of wide-angle still image data and wide-angle moving image data in which a view ahead of the vehicle appears, if it is determined from acceleration data of the vehicle that sudden braking is applied in the vehicle when the one of the wide-angle still image data and the wide-angle moving image data which is the one item of the one of the still image data and the moving image data is captured by the onboard sensor, one of still image data and moving image data in which the view ahead of the vehicle appears, out of the wide-angle still image data and the wide-angle moving image data, may be classified into event data.

For example, in the above-described classifying, in the case where the one item of the one of the still image data and the moving image data is one of wide-angle still image data and wide-angle moving image data in which a view ahead of the vehicle appears, if it is determined from acceleration data of the vehicle that sudden steering to one of left and right of the vehicle is performed when the wide-angle still image data and the wide-angle moving image data which is the one item of the one of the still image data and the moving image data is captured by the onboard sensor, one of still image data and moving image data in which the other of the left and right of the vehicle appears, out of the wide-angle still image data and the wide-angle moving image data, may be classified into event data.

For example, in the above-described classifying, a horizontal size of one of the still image data and the moving image data classified into the event data out of the wide-angle still image data and the wide-angle moving image data may be determined based on speed of the vehicle when the one image is captured.

For example, in the above-described classifying, a horizontal size of one of the still image data and the moving image data classified into the event data out of the wide-angle still image data and the wide-angle moving image data may be smaller as speed of the vehicle when the one image is captured is higher.

Image data storage 121 is a recording medium, such as a random access memory (RAM) or hard disk, for recording data. In image data storage 121, the items of the event data and the items of the non-event data are stored as learning images by learning data acquirer 120. Furthermore, the learning images stored in image data storage 121 are read out by annotation provider 122.

Annotation provider 122 provides the still image data or moving image data with annotation and stores it in learning data storage 123. The annotation is information indicating whether the still image data or moving image data is handled either as the still image data or moving image data in which an event appears or as the still image data or moving image data in which no event appears. Annotation provider 122 provides the event data with the annotation of the positive data and the non-event data with the annotation of the negative data as a general rule. Furthermore, annotation provider 122 provides data determined to be similar to the event data of the non-event data with the annotation of the positive data.

The learning data provided with the annotation of the positive data is also simply referred to as positive data, and the learning data provided with the annotation of the negative data is also simply referred to as negative data. Here, the positive data is data that should be recognized by recognizer 112, which is described later, as data in which an event appears, and the negative data is data that should be recognized by recognizer 112 as data in which no event appears.

For the similarity judgment of the non-event data and event data, annotation provider 122 presents first data which is the still image data or moving image data included in one item of the event data among items of the event data and which is the still image data or moving image data at a predetermined time before an event, that is, the still image data or moving image data in which a photographing object before the predetermined time appears. In addition, annotation provider 122 presents one item of the non-event data among items of the non-event data as second data. When presenting the first data and second data, annotation provider 122 transmits the first data and second data to terminal 13, has them displayed on display device 131, and thereby presents them to the user. Input device 132 subsequently accepts the input of the judgment result by the user as to whether the presented first data and second data are similar to each other, and then annotation provider 122 receives and obtains the judgment result from terminal 13.

In other words, when storing the event data and non-event data in learning data storage 123, annotation provider 122 (a) stores the event data as the positive data, (b) stores the non-event data as the positive data if the received judgment result indicates that the first data and second data are similar, and (c) stores the non-event data as the negative data if the received judgment result indicates that the first data and second data are not similar.

The similarity judgment of the first data and second data may be made by the image recognition processing by a computer. The image recognition processing may include a process of recognizing one or more of the number, a positional relationship, and an optical flow of moving bodies appearing in images shown by the first data and second data.

When presenting the second data, selected one item of the non-event data may be presented by preselecting the one item of the non-event data from the acquired items of the non-event data based on the image recognition processing. The image recognition processing includes recognizing one or more of the number, positional relationship, and optical flow of moving bodies appearing in the images shown by the first data and second data, and selecting the second data similar to the first data presented to the user by terminal 13, for example, together with the one item of the non-event data intended to be selected.

The predetermined time may be determined based on a reaction time, a time from recognition of a danger by the driver of the vehicle until a braking action of the vehicle is taken. In addition, the predetermined time may be determined further based on a processing time of a risk prediction device that performs processing of the risk prediction.

The first data may be the moving image data.

Learning data storage 123 is a recording medium, such as RAM or a hard disk, for recording data. Learning data storage 123 stores the still image data or moving image data with the annotation provided, in other words, the positive data and negative data as the learning data.

Learner 127 learns the risk prediction using the learning data. That is, learner 127 learns features of the positive data and negative data of the learning data stored in learning data storage 123, and thereby constructs the recognition model. Specifically, learner 127 learns features of images which cause an event to occur in the future from the positive data, learns features of images which do not cause an event to occur in the future from the negative data, and thereby constructs the recognition model. Learner 127 stores the constructed recognition model in model storage 128. The constructed recognition model is a recognition model which, when the still image data or moving image data is entered as input data, outputs prediction information on occurrence of an event after time when the still image data or moving image data was captured. Recognition information may be information indicating whether an event will occur in binary or may be information indicating a degree or probability of occurrence of an event by any of 0-100.

Learning by learner 127 is machine learning such as deep learning (neural network), random forest, or genetic programming. Graph cut or the like can be used for recognition and segmentation of an object in an image. Alternatively, a recognizer or the like created by random forest or genetic programming may be used. Also, the recognition model constructed by learner 127 may be a neural network model.

Model storage 128 is a recording medium, such as RAM or a hard disk, for recording data. Model storage 128 stores the recognition model constructed by learner 127. The recognition model stored in model storage 128 is provided for onboard equipment 110 via controller 129.

Controller 129 is a control device that controls operations of functions in server 12. Controller 129 includes a communication interface that communicates with terminal 13 and vehicle 11. Controller 129 transmits and receives the still image data or moving image data and information indicating the result of the similarity judgment between annotation provider 122 and terminal 13. Controller 129 provides the recognition model stored in model storage 128 for vehicle 11 (more specifically, onboard equipment 110).

Generating and classifying of the still image data or moving image data and provision of the annotation to the still image data or moving image data will be described below in detail.

Figure 3:
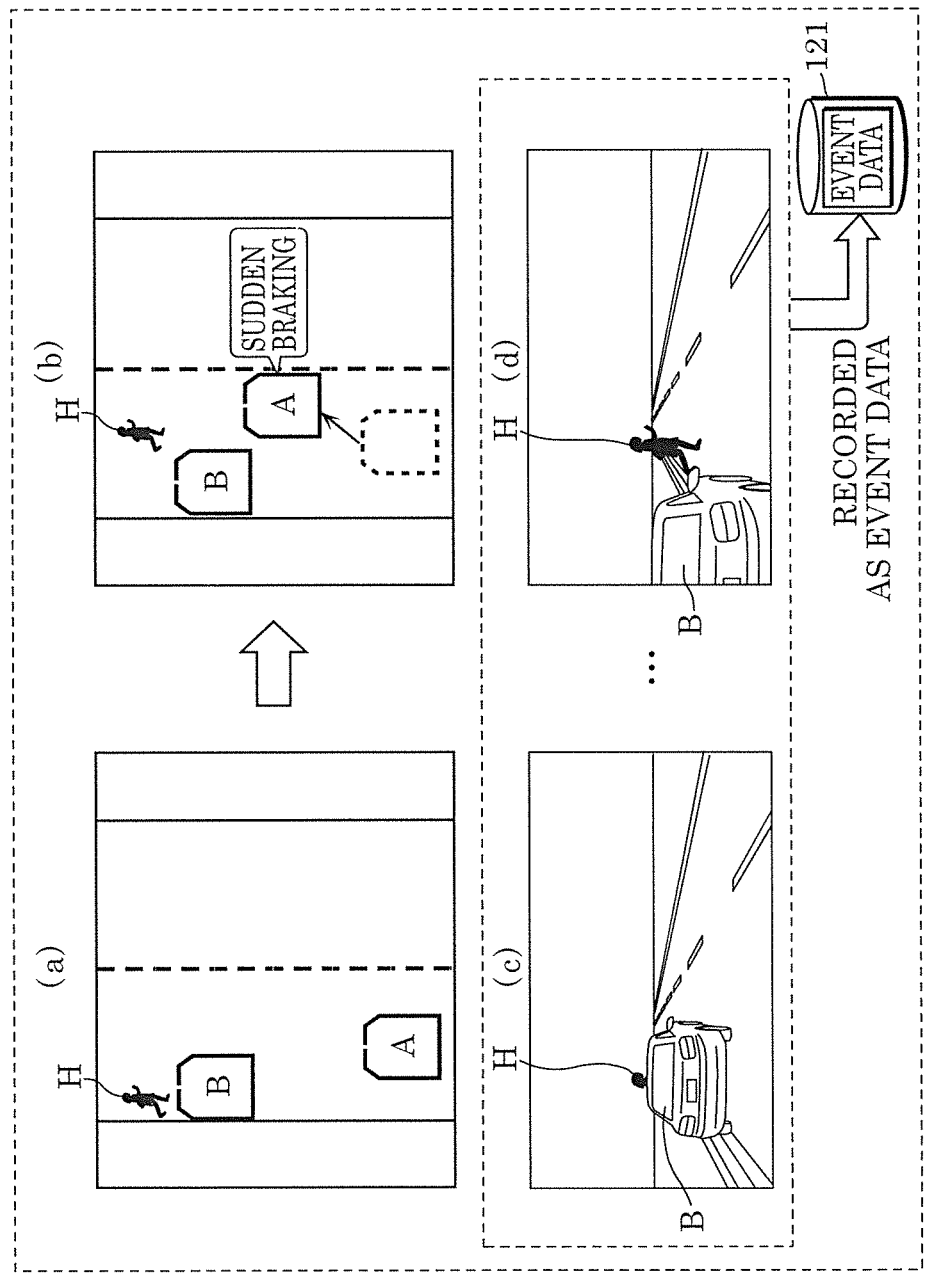
FIG. 3 is an explanatory diagram illustrating a first example of images stored in an image data storage in the embodiment.

FIG. 3 is an explanatory diagram illustrating a first example of images stored in image data storage 121 in the embodiment. Images (a) and (b) in FIG. 3 are diagrams illustrating a positional relationship of vehicles A and B and person H viewed from sky above. Images (c) and (d) in FIG.

3 are each one example of images taken by the onboard sensor of vehicle A which photographed ahead of vehicle A when vehicle A and the like are in the positional relationship of images (a) and (b) in FIG. 3.

In image (a) in FIG. 3, vehicle B, which is another vehicle, is at a stop in front of vehicle A, which is a running host vehicle. In front of vehicle B, person H is about to cross a road from left to right. In this state, a driver of vehicle A is not aware of presence of person H, and is thinking of going through right of vehicle B without decreasing speed.

Image (b) in FIG. 3 shows a state that advanced by several seconds from the state of image (a) in FIG. 3. It is the state in which, when vehicle A is about to go through the right of vehicle B, the driver of vehicle A has noticed presence of person H and applied sudden braking.

Image (c) in FIG. 3 is an example of an image of the view ahead photographed by the onboard sensor of vehicle A in the state of image (a) in FIG. 3. The image shows vehicle B and also slightly shows the head of person H.

Image (d) in FIG. 3 is an example of an image of the view ahead photographed by the onboard sensor of vehicle A in the state of image (b) in FIG. 3. This image shows enlarged vehicle B and also shows an enlarged whole body of person H.

At this time, the onboard sensor of vehicle A has obtained still image data or moving image data for a predetermined time including images (c) and (d) in FIG. 3. The still image data or moving image data is handled as the event data based on detection of application of sudden braking in vehicle A by an acceleration sensor or the like of vehicle A. As a result, vehicle A transmits the still image data or moving image data as the event data to server 12.

Figure 4:
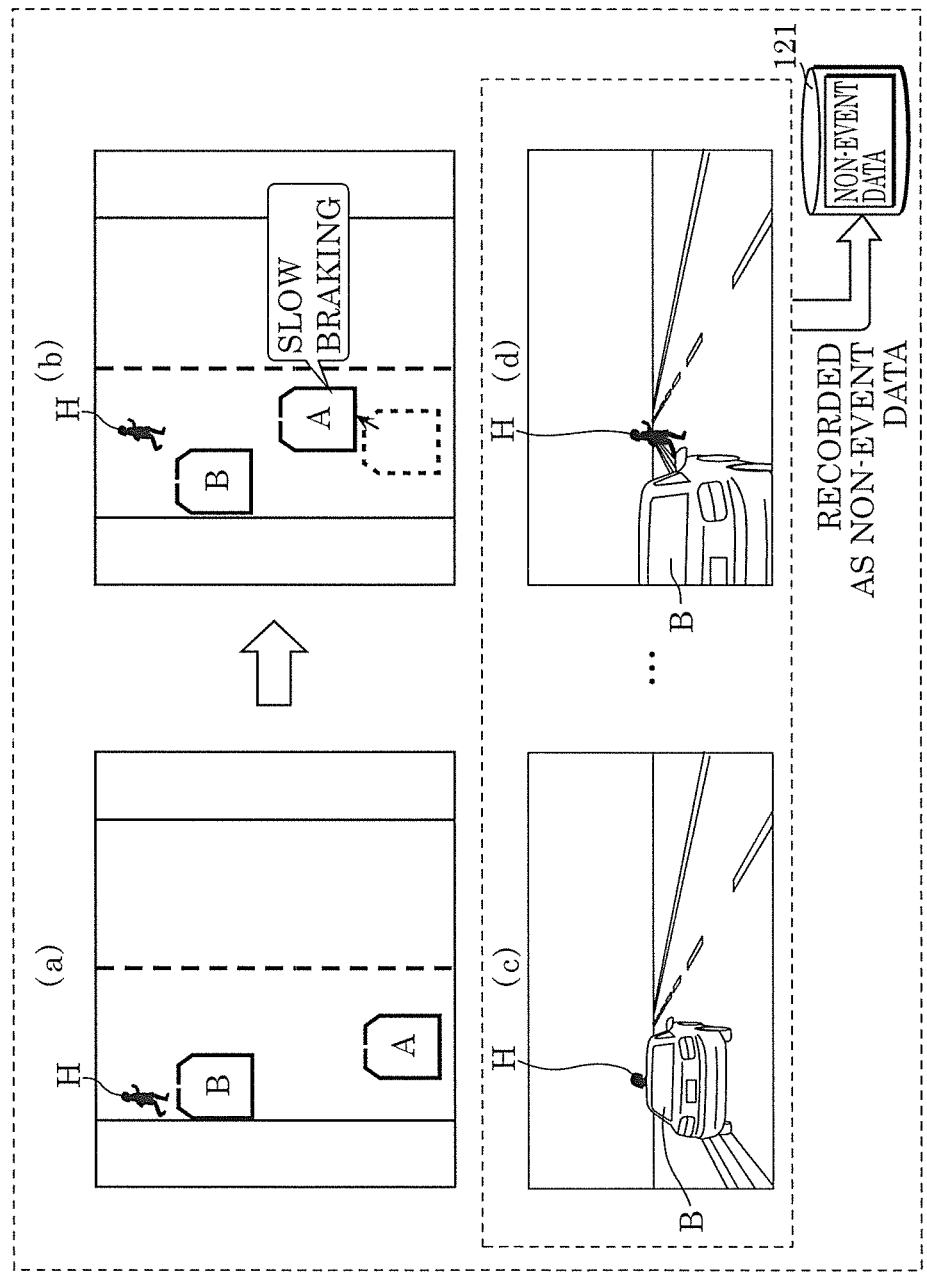
FIG. 4 is an explanatory diagram illustrating a second example of images stored in the image data storage in the embodiment.

FIG. 4 is an explanatory diagram illustrating a second example of images stored in image data storage 121 in the embodiment. Images (a)-(d) in FIG. 4 show the same positional relationship and images as those in FIG. 3.

Image (a) in FIG. 4 shows the same positional relationship as image (a) in FIG. 3. In this state, the driver of vehicle A notices presence of person H, and is thinking of decreasing the speed to go through the right of vehicle B or stopping as necessary.

Image (b) in FIG. 4 shows a state that advanced by several seconds from the state of image (a) in FIG. 4. It is a state in which the driver of vehicle A is slowly applying the brake.

Image (c) in FIG. 4 shows the same image as image (c) in FIG. 3.

Image (d) in FIG. 4 is an example of an image of the view ahead photographed by the onboard sensor of vehicle A in the state of image (b) in FIG. 4. The image shows vehicle B and also shows the whole body of person H. However, the size of the image of person H shown in image (d) in FIG. 4 is smaller than the size of the image of person H shown in image (d) in FIG. 3. That is because distance from vehicle A to person H is larger in images (b) and (d) in FIG. 4.

At this time, the onboard sensor of vehicle A has obtained still image data or moving image data for the predetermined time including images (c) and (d) in FIG. 4. Because it is not detected by the acceleration sensor or the like of vehicle A that vehicle A has applied sudden braking, the still image data or moving image data is handled as the non-event data. Therefore, vehicle A transmits the still image data or moving image data as the non-event data to server 12.

Server 12 creates the learning data from the event data and non-event data obtained as described above. Generally, the learning data is created by setting the event data as the positive data and the non-event data as the negative data when the learning data is created from the event data and non-event data.

However, by learning based on the learning data created by simply setting the event data as the positive data and the non-event data as the negative data, an appropriate recognition model may not be constructed. This will be described below.

For example, in the event data shown in FIG. 3, image (c) in FIG. 3 indicates a situation in which occurrence of an event is predicted because sudden braking is applied after this. Therefore, it is necessary for image (c) in FIG. 3 to be recognized as an image from which occurrence of an event is predicted in the recognition model created based on the learning data. On the other hand, image (c) in FIG. 4 indicates a situation in which occurrence of an event is not predicted because sudden braking is not applied after this. Therefore, it is necessary for image (c) in FIG. 4 to be recognized as an image from which occurrence of an event is not predicted in the recognition model.

However, image (c) in FIG. 3 and image (c) in FIG. 4 are the same. If image (c) in FIG. 3 is learned as an image from which occurrence of an event is predicted whereas image (c) in FIG. 4 is learned as an image from which occurrence of an event is not predicted, conflicting contents are learned from the same image, and an appropriate recognition model is not constructed.

Annotation provider 122 of the embodiment classifies even non-event data into the positive data when the image is similar to the event data. This can avoid the above-described case where the appropriate recognition model is not constructed.

Figure 5:
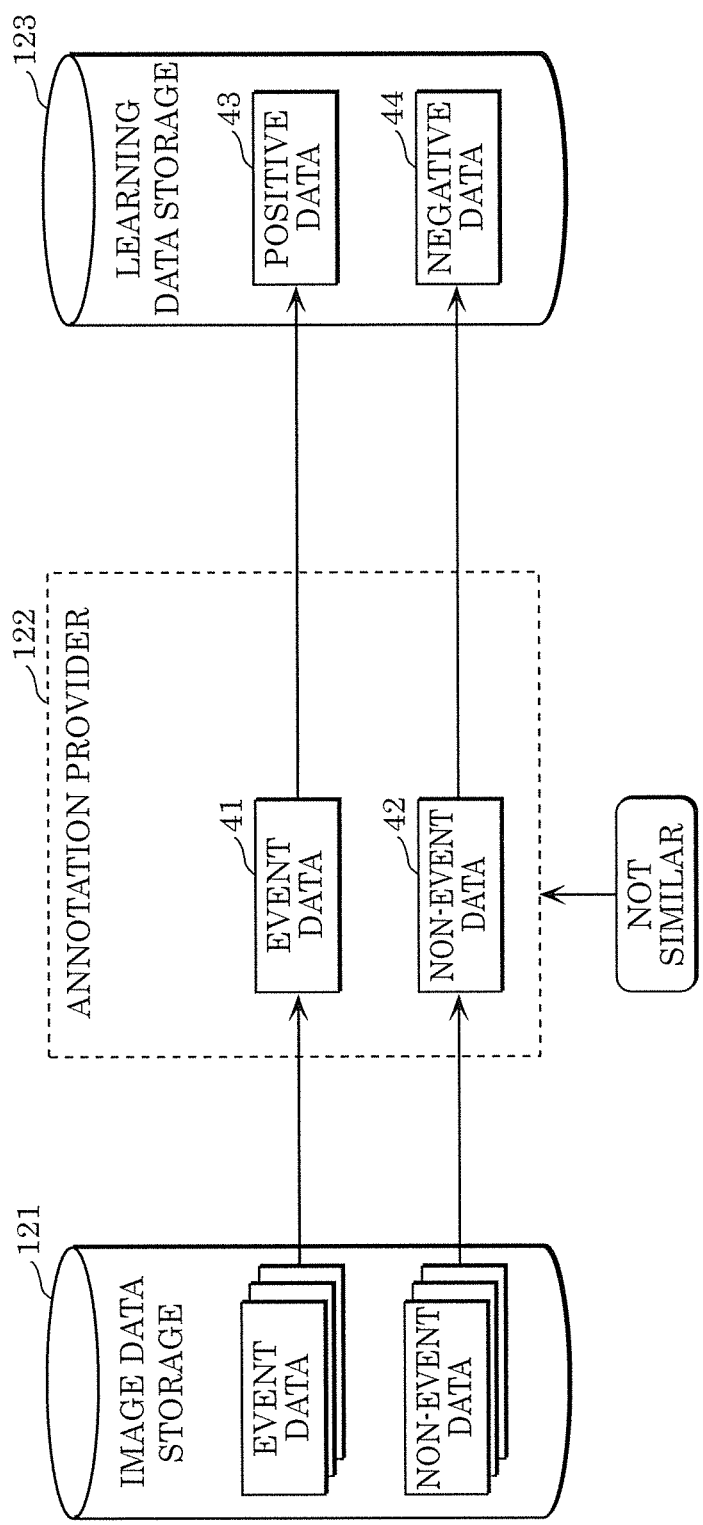
FIG. 5 is a first explanatory diagram of annotation provision by an annotation provider in the embodiment.
Figure 6:
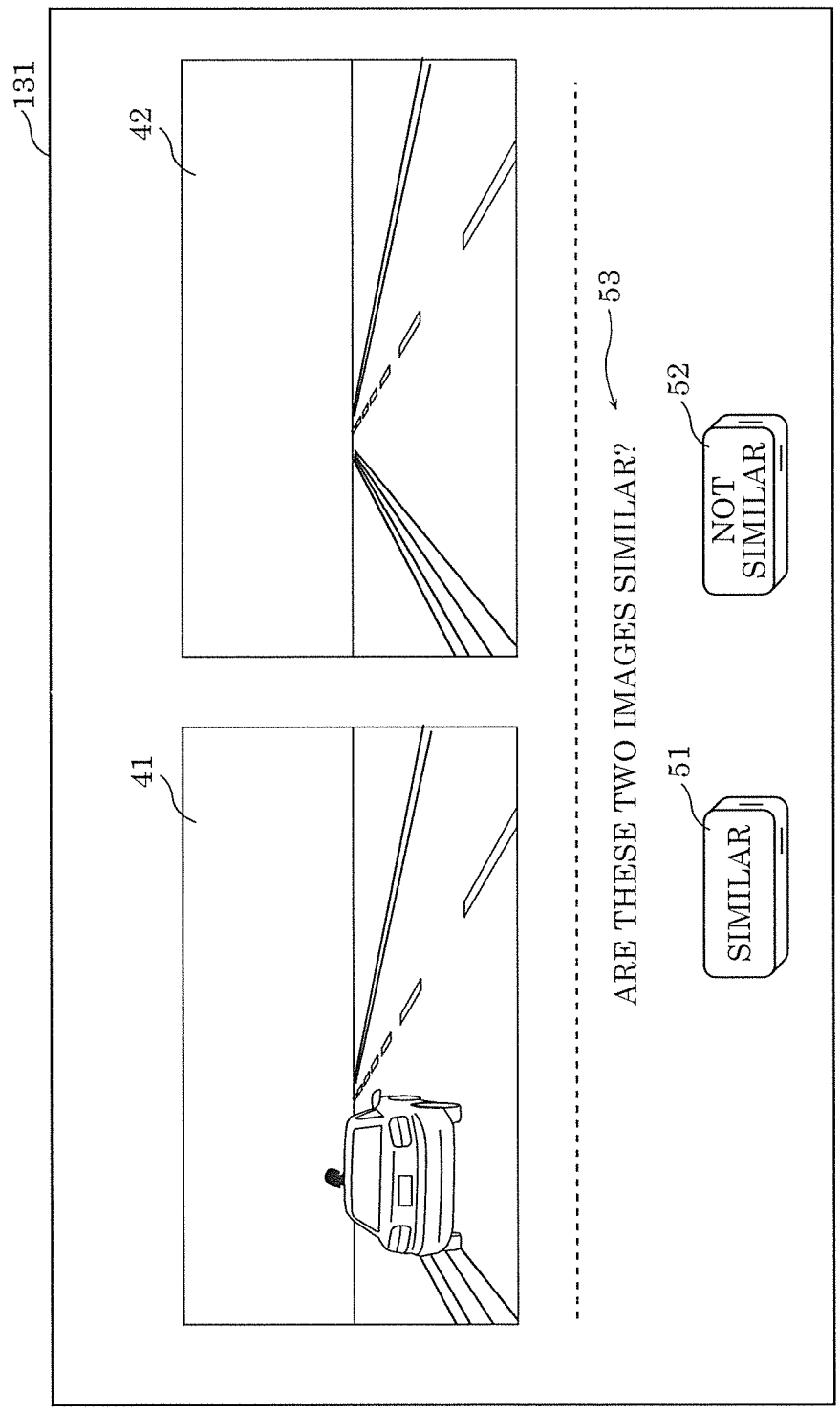
FIG. 6 is a first explanatory diagram of images presented at a time of the annotation provision by the annotation provider in the embodiment.

FIG. 5 is a first explanatory diagram of annotation provision by annotation provider 122 in the embodiment. FIG. 6 is a first explanatory diagram of an image presented at a time of the annotation provision by annotation provider 122 in the embodiment.

As shown in FIG. 5, annotation provider 122 acquires event data 41 which is one of the items of the event data stored in image data storage 121. Also, annotation provider 122 acquires non-event data 42 which is one of the items of the non-event data stored in image data storage 121.

Annotation provider 122 then transmits event data 41 and non-event data 42 to terminal 13 via controller 129, and causes display device 131 to display them (see FIG. 6). Display device 131 displays button images 51 and 52 for accepting a judgment result by the user as to whether event data 41 and non-event data 42 are similar to each other. At this time, display device 131 may display image 53 including a character string asking the user whether the displayed two images are similar. When an operation on button image 51 or 52 is performed based on the similarity judgment by the user, annotation provider 122 accepts operation data via controller 129. If button image 51 is operated, the operation data is "similar," and if button image 52 is operated, the operation data is "not similar."

Description will be continued for the case where the operation data is "not similar."

When the operation data is "not similar," annotation provider 122 provides non-event data 42 with annotation of the negative data and stores it in learning data storage 123. In other words, annotation provider 122 stores non-event data 42 as negative data 44 in learning data storage 123. In addition, annotation provider 122 provides event data 41 with annotation of the positive data and stores it in learning data storage 123. In other words, annotation provider 122 stores event data 41 as positive data 43 in learning data storage 123.

Next, description will be made for the case where the operation data is "similar."

Figure 7:
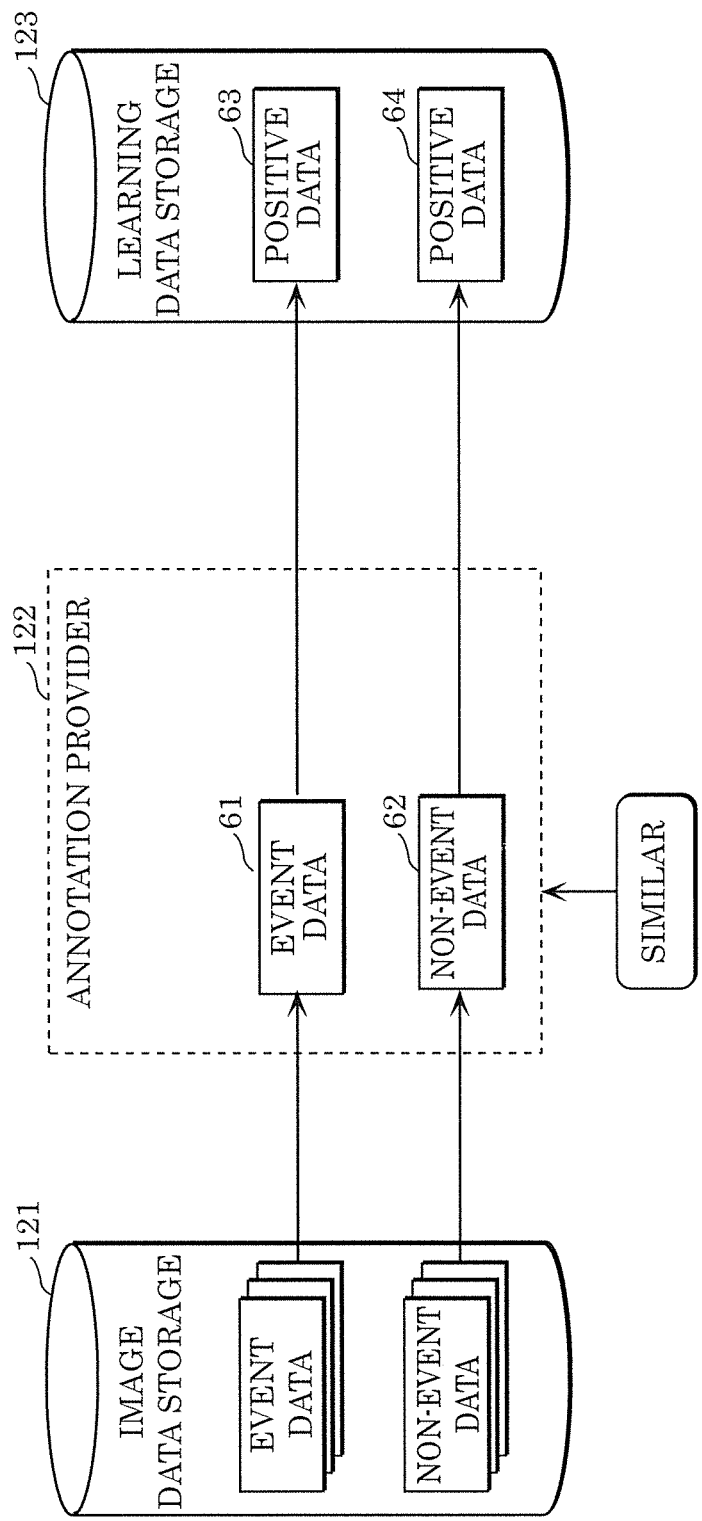
FIG. 7 is a second explanatory diagram of the annotation provision by the annotation provider in the embodiment.

FIG. 7 is a second explanatory diagram of the annotation provision by annotation provider 122 in the embodiment.

As shown in FIG. 7, when the operation data is "similar," annotation provider 122 provides non-event data 62 with annotation of the positive data and stores it in learning data storage 123. In other words, annotation provider 122 stores non-event data 62 as positive data 64 in learning data storage 123. Regarding event data 61, in the same manner as the above-described "similar," annotation provider 122 provides it with annotation of the positive data and stores it in learning data storage 123.

In this way, the event data shown in FIG. 3 and the non-event data shown in FIG. 4 are both stored as the positive data in learning data storage 123. Then, both of the data are appropriately learned as images from which occurrence of an event is predicted.

The above description shows an example in which annotation provider 122 determines whether non-event data 42 or 62 is either the negative data or positive data based on one-time similarity judgment of event data 41 or 61 and non-event data 42 or 62. However, annotation provider 122 may determine whether the non-event data is either the negative data or positive data in consideration of the similarity judgments by a plurality of different users in a comprehensive manner. For example, if a predetermined degree (for example, about 70%-80%) or more of the plurality of the users judge that they are similar, a result of the similarity judgment may be determined to be similar, and otherwise, the result of the similarity judgment may be determined to be not similar.

It is also arbitrary which item of the event data among the items of the event data and which item of the non-event data among the items of the non-event data are presented to the user.

Annotation provider 122 may provide the event data with annotation of the negative data. This is processing to be performed when no event actually appears in the event data. This processing will be described below.

Figure 8:
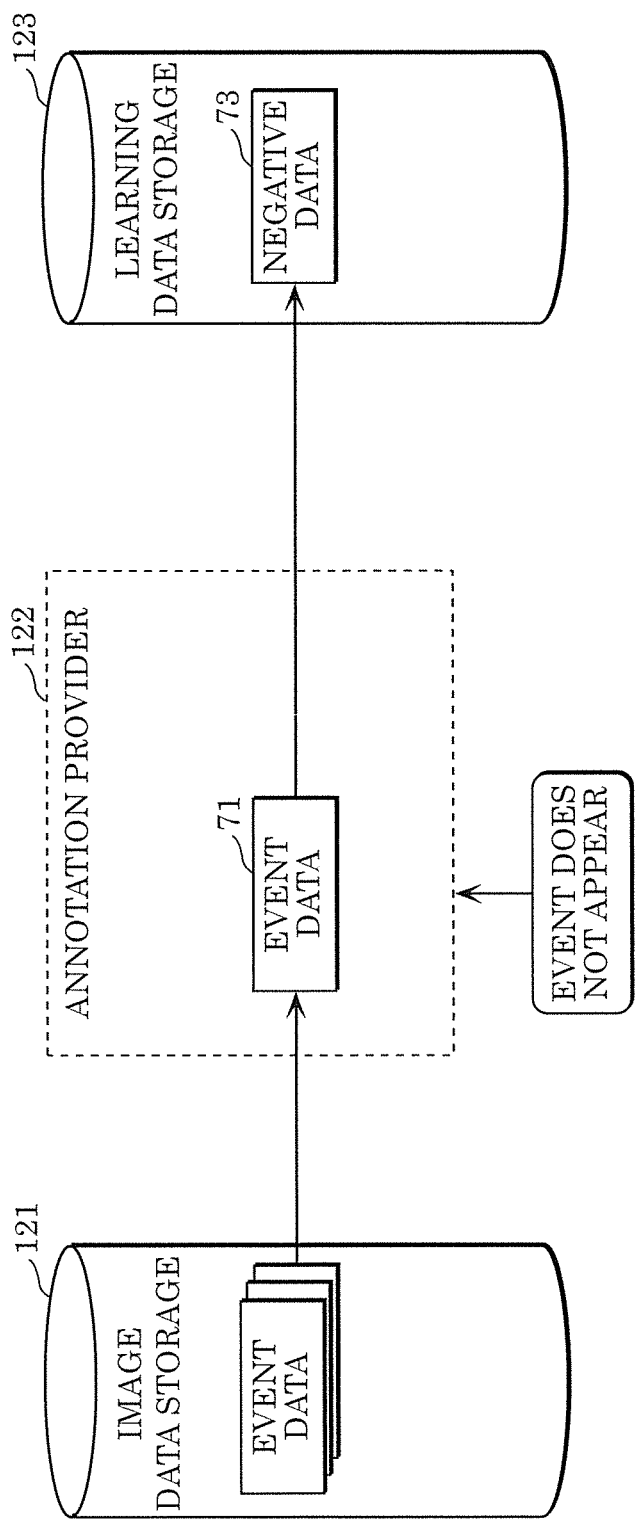
FIG. 8 is a third explanatory diagram of the annotation provision by the annotation provider in the embodiment.
Figure 9:
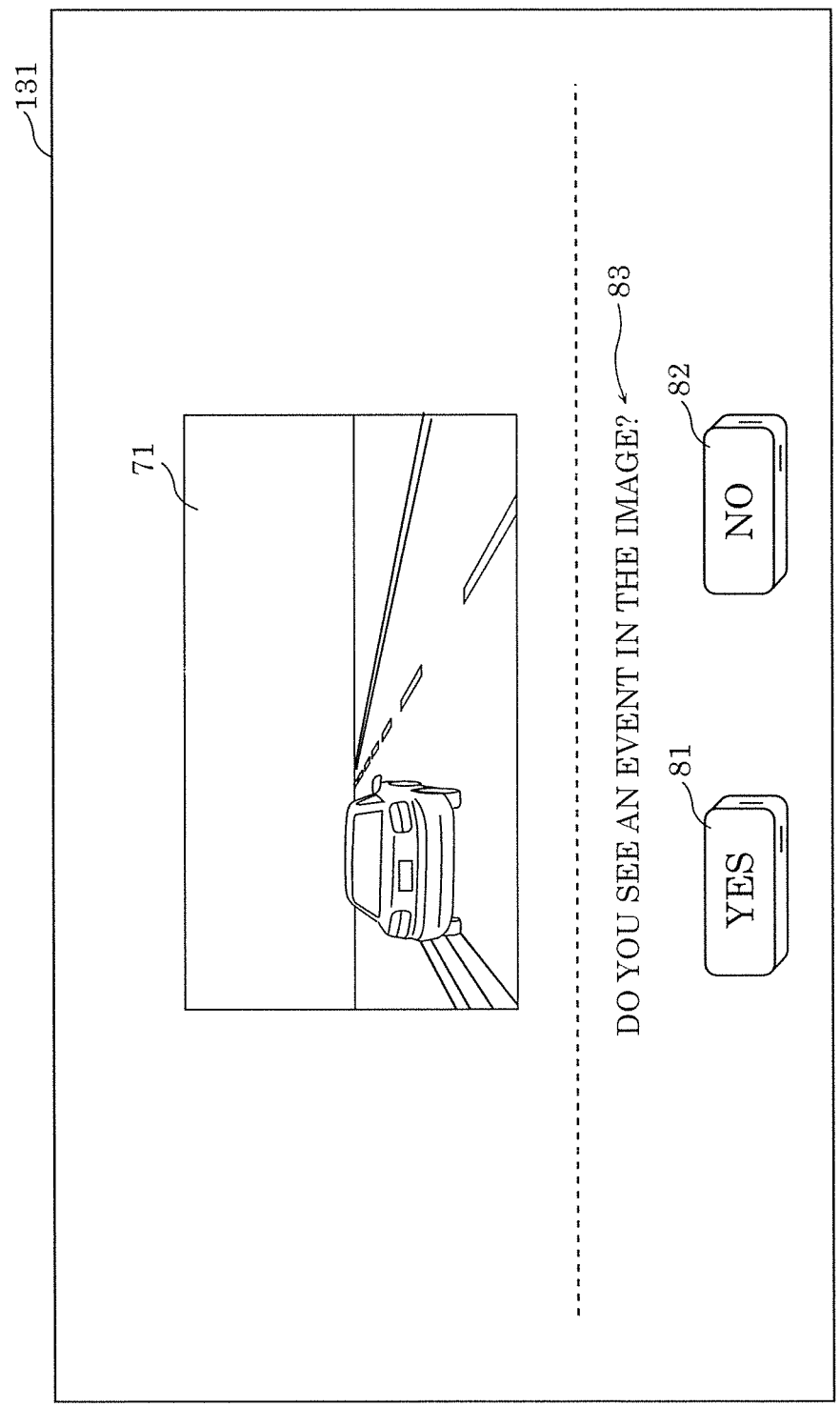
FIG. 9 is a second explanatory diagram of images presented at a time of the annotation provision by the annotation provider in the embodiment.

FIG. 8 is a third explanatory diagram of the annotation provision by annotation provider 122 in the embodiment. FIG. 9 is a second explanatory diagram of an image presented at a time of the annotation provision by annotation provider 122 in the embodiment.

As shown in FIG. 8, annotation provider 122 acquires event data 71 which is one item of the items of the event data stored in image data storage 121.

Annotation provider 122 then transmits event data 71 to terminal 13 via controller 129 and causes display device 131 to display it (see FIG. 9). Display device 131 displays button images 81 and 82 for accepting a judgment result as to whether an event actually appears in event data 71. At this time, display device 131 may display image 83 including a character string asking the user whether an event actually appears in displayed event data 71. When an operation on button image 81 or 82 is performed based on a judgment by the user, annotation provider 122 accepts operation data via controller 129.

If the result of the judgment by the user indicates that no event actually appears in event data 71, annotation provider 122 provides event data 71 with annotation of the negative data and stores it in learning data storage 123. In other words, annotation provider 122 stores event data 71 as negative data 73 in learning data storage 123.

On the other hand, if the result of the judgment by the user indicates that an event actually appears in event data 71, annotation provider 122 provides event data 71 with annotation of the positive data and stores it in learning data storage 123 in the same manner as event data 41 in FIG. 5.

Learning is performed by learner 127 using the learning data stored in learning data storage 123 in this way, and a recognition model generated as a result is stored in model storage 128.

Next, onboard equipment 110 that makes the risk prediction and vehicle 11 equipped with onboard equipment 110 will be described.

Figure 10:
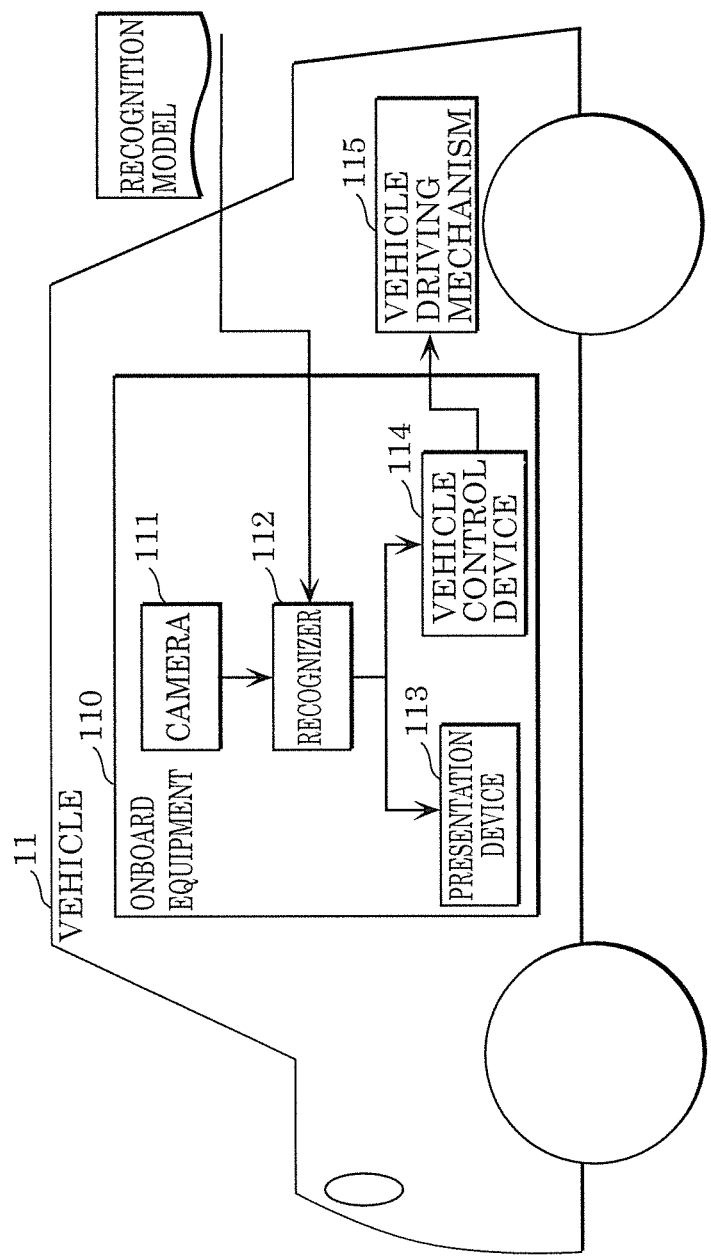
FIG. 10 is a block diagram illustrating a functional configuration of a vehicle in the embodiment.

FIG. 10 is a block diagram illustrating a functional configuration of vehicle 11.

As shown in FIG. 10, vehicle 11 includes onboard equipment 110 and vehicle driving mechanism 115.

Onboard equipment 110 includes camera 111, recognizer 112, presentation device 113, and vehicle control device 114.

Camera 111 is mounted on vehicle 11 so as to photograph surroundings of vehicle 11. Specifically, camera 111 is mounted on vehicle 11 at a position and orientation where camera 111 can photograph the view ahead of vehicle 11. When photographing the view ahead of vehicle 11, camera 111 outputs, to recognizer 112, a photographic image which is an image generated by the photographing.

Recognizer 112 acquires and holds the recognition model from server 12 via network N. Here, the recognition model acquired by recognizer 112 is a recognition model for predicting occurrence of an event that may occur after an image is taken based on the image taken by the vehicle. Recognizer 112 acquires the photographic image which is an image generated by photographing the view ahead of vehicle 11 by camera 111 mounted on vehicle 11. Then, recognizer 112 enters the photographic image as input data into the recognition model, thereby detects whether an event will occur after taking the photographic image, and generates prediction information. The prediction information is information indicating whether an event will occur after a current time point. Recognizer 112 outputs the generated prediction information to presentation device 113 and vehicle control device 114. The prediction information is, for example, an image or a sound indicating that an event may occur hereafter by characters or drawings.

Presentation device 113 is a presentation device that presents information, and includes, for example, a display device such as a liquid crystal display or an organic EL display, or a sound output device such as a speaker. Here, a case where presentation device 113 is a display device will be described as an example.

On acquiring the prediction information from recognizer 112, presentation device 113 displays the prediction information as an image, and presents it to the driver of vehicle 11.

Vehicle control device 114 is a control device that controls driving of vehicle 11, especially acceleration and deceleration of vehicle 11. On acquiring the prediction information from recognizer 112, vehicle control device 114 performs control, for example, to decelerate vehicle 11 based on the prediction information. Control of driving of vehicle 11 is performed by vehicle driving mechanism 115.

Vehicle driving mechanism 115 is a control device that controls driving of vehicle 11. Vehicle driving mechanism 115 controls, under control from vehicle control device 114, driving of vehicle 11, specifically, acceleration and deceleration, steering, and the like.

Processing performed by risk prediction system 1 configured as described above will be described.

Figure 11:
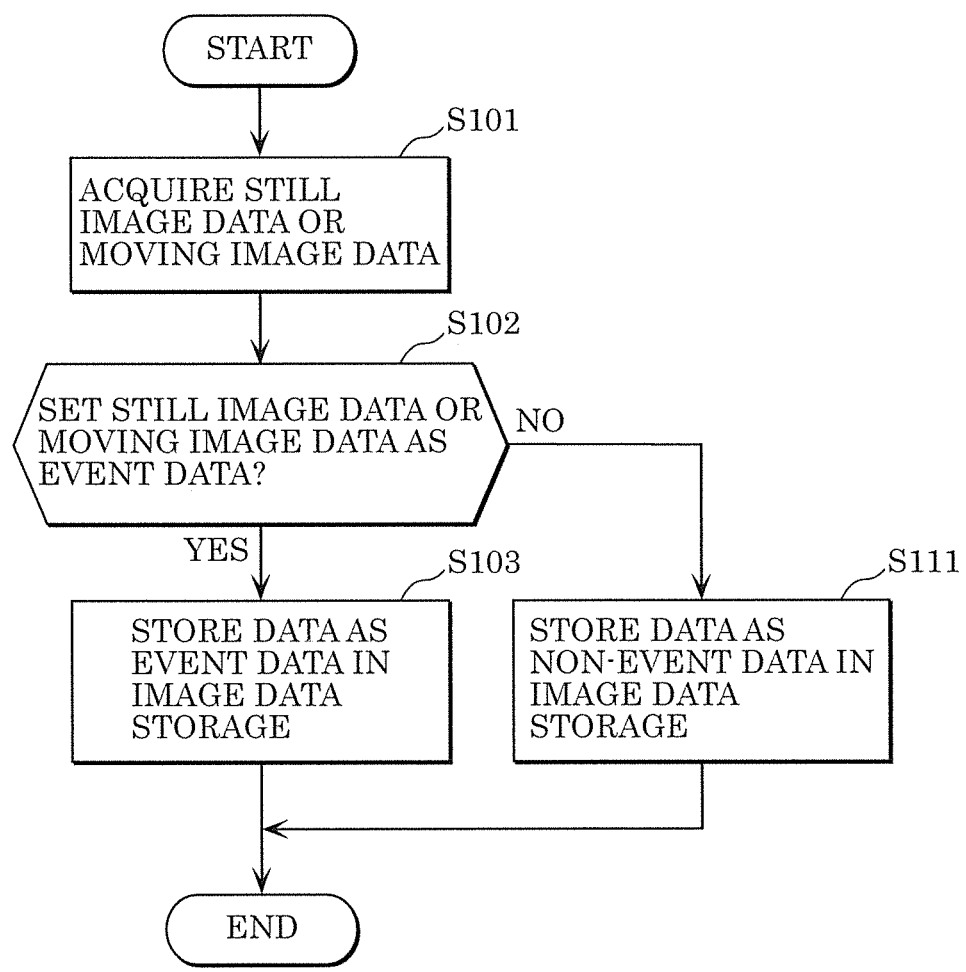
FIG. 11 is a flowchart illustrating classification processing of still image data or moving image data in the embodiment.

FIG. 11 is a flowchart illustrating classification processing of the still image data or moving image data in the embodiment. This processing is performed by the onboard equipment, for example, every predetermined time (for example, 20 seconds).

As shown in FIG. 11, in step S101, the onboard equipment acquires the still image data or moving image data by the onboard sensor. The still image data or moving image data is, for example, moving image data having a time length of a predetermined time. Here, the onboard equipment is not limited to onboard equipment 110 of vehicle 11 equipped with recognizes 112 that makes the risk prediction. At this time, the onboard equipment may acquire acceleration data and the like of the vehicle equipped with the onboard equipment.

In step S102, the onboard equipment determines whether to set the acquired still image data or moving image data as the event data. This determination may be made by image recognition processing targeted for the still image data or moving image data itself, or may be made by detecting application of sudden braking or execution of sudden steering based on the acceleration data of the vehicle when the still image data or moving image data is acquired. If it is determined that the acquired still image data or moving image data is set as the event data, the processing proceeds to step S103, and otherwise, the processing proceeds to step S111.

In step S103, the onboard equipment transmits the still image data or moving image data acquired in step S101 as the event data to server 12. Server 12 stores the received still image data or moving image data as the event data in image data storage 121.

In step S111, the onboard equipment transmits the still image data or moving image data acquired in step S101 as the non-event data to server 12. Server 12 stores the received still image data or moving image data as the non-event data in image data storage 121.

Figure 12:
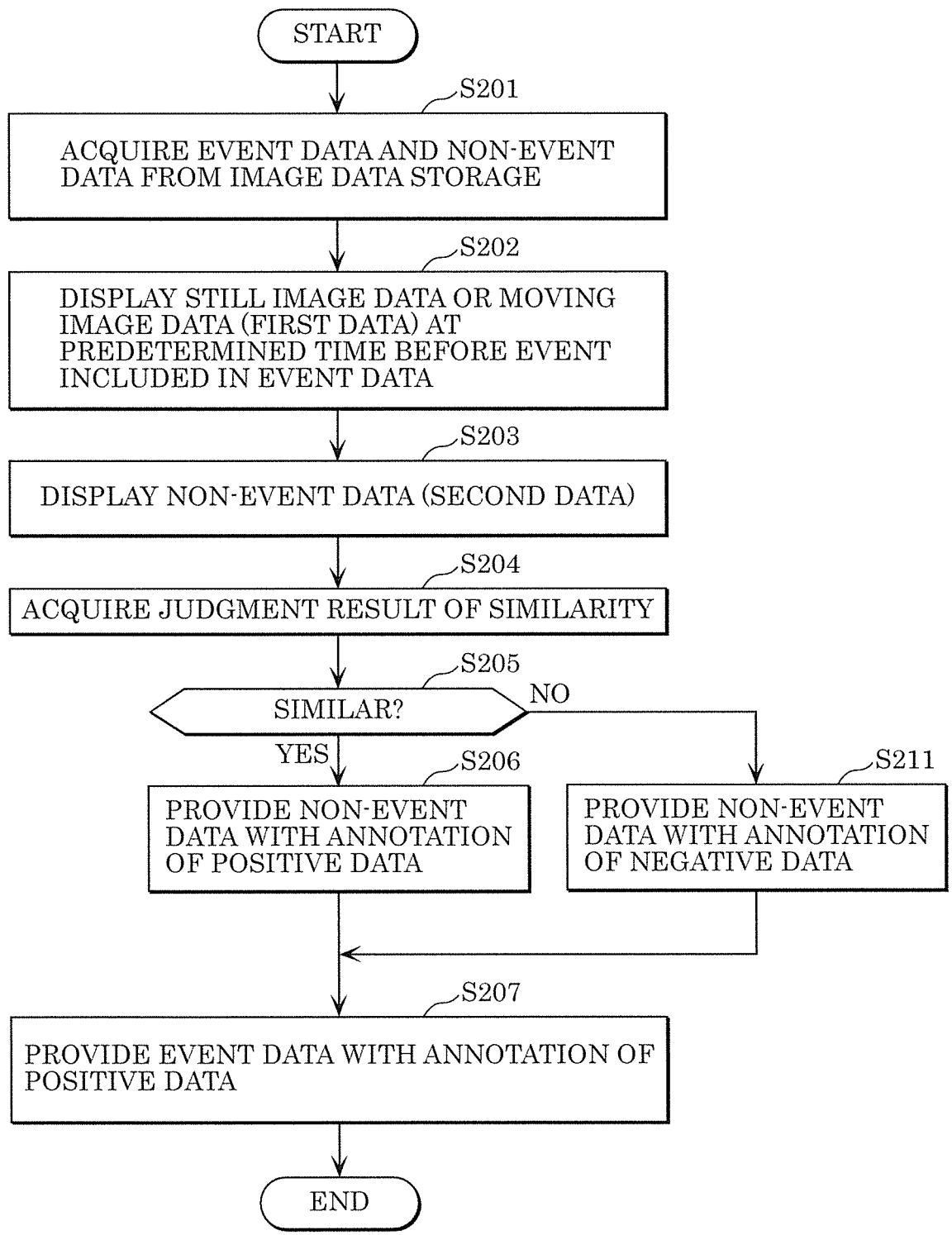
FIG. 12 is a flowchart illustrating generation processing of learning data in the embodiment.

FIG. 12 is a flowchart illustrating generation processing of the learning data in the embodiment.

As shown in FIG. 12, in step S201, annotation provider 122 acquires the event data and non-event data from image data storage 121.

In step S202, annotation provider 122 transmits the still image data or moving image data at a predetermined time before an event included in the event data acquired in step S201 to terminal 13, and has display device 131 display it. The still image data or moving image data is also referred to as first data.

In step S203, annotation provider 122 transmits the non-event data acquired in step S201 to terminal 13, and has display device 131 display it. The non-event data is also referred to as second data.

In step S204, annotation provider 122 acquires a judgment result of the user as to whether the first data and second data are similar from terminal 13.

In step S205, it is determined whether or not the result of the similarity judgment acquired in step S204 indicates that they are similar. If it indicates that they are similar (Yes in step S205), the processing proceeds to step S206, and otherwise (No in step S205), the processing proceeds to step S211.

In step S206, annotation provider 122 provides the non-event data with annotation of the positive data and stores it in learning data storage 123.

In step S207, annotation provider 122 provides the event data with annotation of the positive data and stores it in learning data storage 123.

In step S211, annotation provider 122 provides the non-event data with annotation of the negative data and stores it in learning data storage 123. Upon completion of step S211, the series of processing ends.

Execution order of steps S202 and S203 may be reversed, or may be done concurrently.

Figure 13:
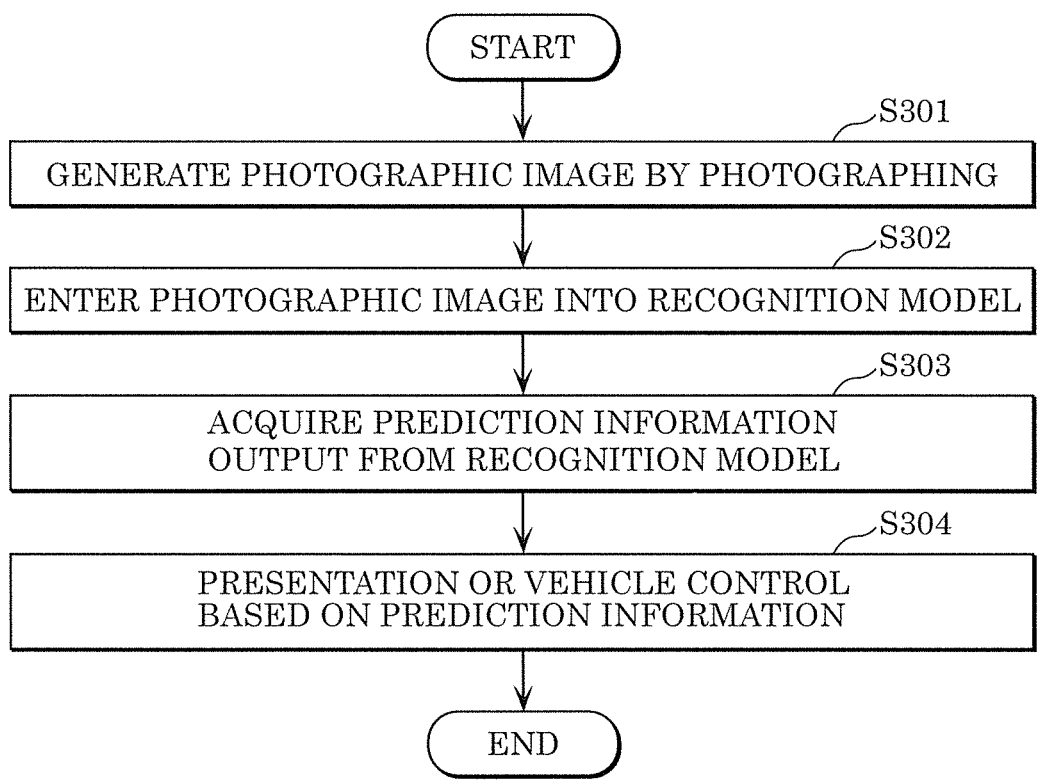
FIG. 13 is a flowchart illustrating processing of onboard equipment in the embodiment.

FIG. 13 is a flowchart illustrating processing related to a risk prediction method performed by onboard equipment 110 in the embodiment.

As shown in FIG. 13, in step S301, camera 111 of onboard equipment 110 generates a photographic image by photographing.

In step S302, recognizer 112 enters the photographic image generated by camera 111 in step S301 as input data into a recognition model.

In step S303, recognizer 112 obtains information output by entering the photographic image into the recognition model in step S302. The information output from the recognition model includes prediction information indicating whether an event will occur after the photographic image that was entered into the recognition model in step S302. Recognizer 112 obtains the information output from the recognition model and thereby obtains the prediction information indicating whether an event will occur after the photographic image.

In step 304, onboard equipment 110 uses the prediction information obtained in step S303 to present an image including the prediction information or control vehicle 11.

By doing so, in risk prediction system 1, using the recognition model related to the risk prediction generated by machine learning by server 12, onboard equipment 110 can detect the risk prediction related to travelling of vehicle 11 with higher accuracy.

As described above, according to the risk prediction method in this embodiment, the data similar to the event data of the non-event data is used for learning as positive data. In the related art, because non-event data is uniformly used for learning as negative data, data similar to event data of non-event data is used for learning as negative data. In that case, if one of the event data and the non-event data that are similar to each other is learned as positive data, and the other is learned as the negative data, a recognition model generated by learning may become inappropriate. Therefore, when the event data and the non-event data are similar to each other, by learning both as the positive data, it is possible to avoid the recognition model becoming inappropriate, and obtain the appropriate recognition model. According to a learning data creation method according to one aspect of the present disclosure, by learning based on the learning data created in this way, it is possible to appropriately predict risk events including an accident or incident that will occur in the future.

Furthermore, by using the reaction time as the predetermined time, it is possible to appropriately predict risk events including an accident or incident that will occur in the future more easily.

Furthermore, by using the reaction time and the processing time of the risk prediction device as the predetermined time, it is possible to appropriately predict risk events including an accident or incident that will occur in the future more easily.

According to the above aspect, by creating the learning data using the moving image data as the event data and the non-event data, it is possible to more accurately learn features of the event data and features of the non-event data. As a result, it is possible to appropriately predict risk events including an accident or incident that will occur in the future.

Furthermore, by using the moving image data as the first data, it is possible to more accurately make a similarity judgment with second data which is the non-event data. As a result, it is possible to appropriately predict risk events including an accident or incident that will occur in the future.

Furthermore, the event data in which it is determined that no event actually appears is learned as the negative data. This can make the recognition model more appropriate, and as a result, it is possible to appropriately predict risk events including an accident or incident that will occur in the future.

Furthermore, the similarity judgment between a first image and a second image is automatically made by image recognition processing. This can make the similarity judgment in accordance with certain standards without manual intervention. As a result, it is possible to appropriately predict risk events including an accident or incident that will occur in the future.

Furthermore, by recognizing the number, the positional relationship, or the optical flow of moving bodies as image recognition processing, it is possible to appropriately predict risk events such as an accident or incident that will occur in the future based on more specific recognition processing.

Furthermore, by obtaining the event data and the non-event data by classifying images obtained by the onboard sensor, it is possible to more easily appropriately predict risk events including an accident or incident that will occur in the future.

Furthermore, it is possible to classify the event data based on collision of a body (for example, another vehicle, a person, etc.) with the vehicle or a body suddenly coming close. By more easily classifying the still image data or the moving image data obtained by the onboard sensor into the event data in this way, as a result, it is possible to appropriately predict risk events including an accident or incident that will occur in the future.

Furthermore, the event data can be classified based on sudden braking or sudden steering in the vehicle. By more easily classifying the still image data or the moving image data obtained by the onboard sensor into the event data in this way, as a result, it is possible to appropriately predict risk events including an accident or incident that will occur in the future.

Furthermore, an image is classified into the non-event data if the danger signal is received by the inter-vehicle communication. This is for excluding still image data or moving image data from a learning object because there is a possibility of being unable to obtain information on risk prediction from the still image data or moving image data, if the danger signal is received by the inter-vehicle communication, even if sudden braking is applied or sudden steering is performed in the vehicle.

Furthermore, when sudden braking in the vehicle is applied, the still image data or the moving image data including a travel direction of the vehicle included in the wide-angle still image data or moving image data is classified into the event data. When sudden braking is applied, there is a possibility that some object or the like may exist in the travel direction of the vehicle. Therefore, by learning the direction of the object as the event data, it is possible to appropriately learn and predict a risk event.

Furthermore, the still image data or the moving image data including an opposite direction from a direction of sudden steering included in the wide-angle still image data or moving image data is classified into the event data. When sudden steering is performed, there is a possibility that some object or the like may exist in the direction opposite from the direction of steering. Therefore, by learning the direction of the object as the event data, it is possible to appropriately learn and predict a risk event.

Furthermore, a horizontal width of an image to be made into the event data can be adjusted in accordance with a width of a driver's field of view which varies according to speed of the vehicle. Therefore, it is possible to appropriately learn and predict a risk event by using the still image data or the moving image data of which width changes based on a change in the width of the field of view of the driver in the vehicle as the event data.

Furthermore, the horizontal width of an image to be made into the event data can be adjusted in accordance with the width of the driver's field of view which varies according to speed of the vehicle. It is because, generally, if speed of the vehicle is high, the field of view of the driver in the vehicle becomes narrower, and an event is included in the narrowed field of view. Therefore, in consideration of a fact that the field of view of the driver in the vehicle becomes narrower as speed of the vehicle is higher, it is possible to appropriately learn and predict a risk event by using the still image data or the moving image data of which horizontal width changes as the event data.

Variation of Embodiment

In this variation, a variation of part or all of risk prediction system 1 or the like of the embodiment will be described. However, risk prediction system 1 and the like are not limited to the following description.

Figure 14:
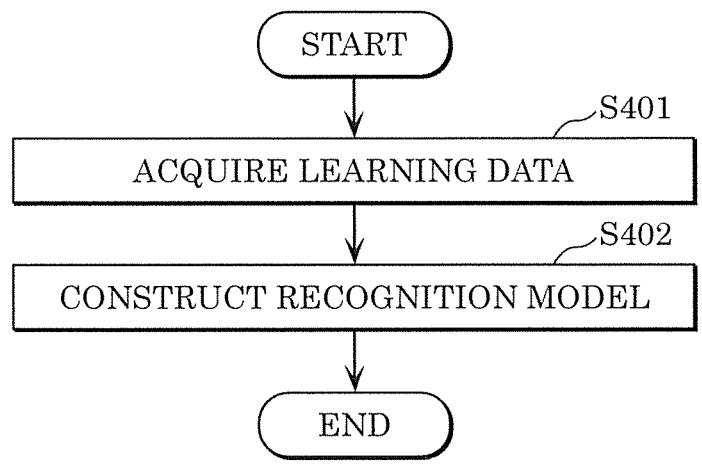
FIG. 14 is a flowchart illustrating a learning method according to a variation of the embodiment.

FIG. 14 is a flowchart illustrating a risk prediction learning method according to the variation.

As shown in FIG. 14, a leaning method for risk prediction by a risk prediction device according to the variation acquires learning data created according to the above-described learning data creation method (S401), learns features of positive data and negative data included in the learning data based on the acquired learning data, and thereby constructs a recognition model (S402).

Figure 15:
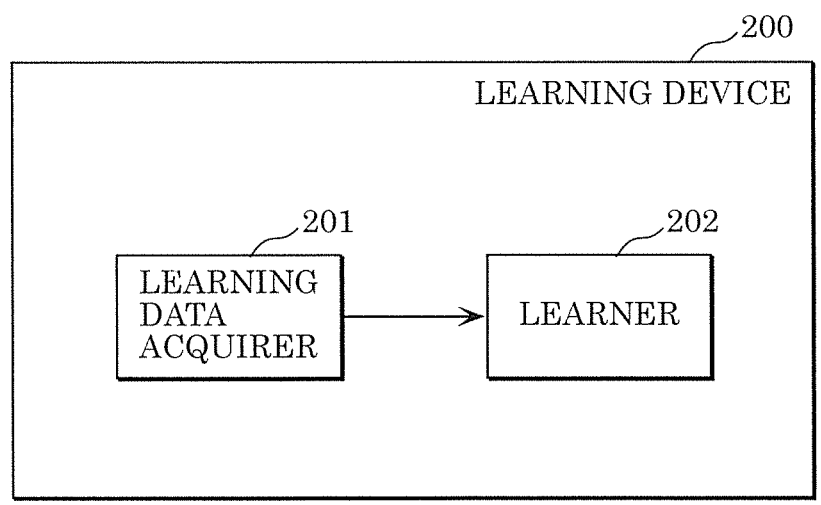
FIG. 15 is a block diagram illustrating a learning device according to the embodiment.

FIG. 15 is a block diagram illustrating learning device 200 according to the variation.

As shown in FIG. 15, learning device 200 for the risk prediction by the risk prediction device according to the variation includes learning data acquirer 201 that acquires the learning data created according to the above-described learning data creation method and learner 202 that constructs, using the acquired learning data, a recognition model by learning features of each of positive data and negative data included in the learning data.

Figure 16:
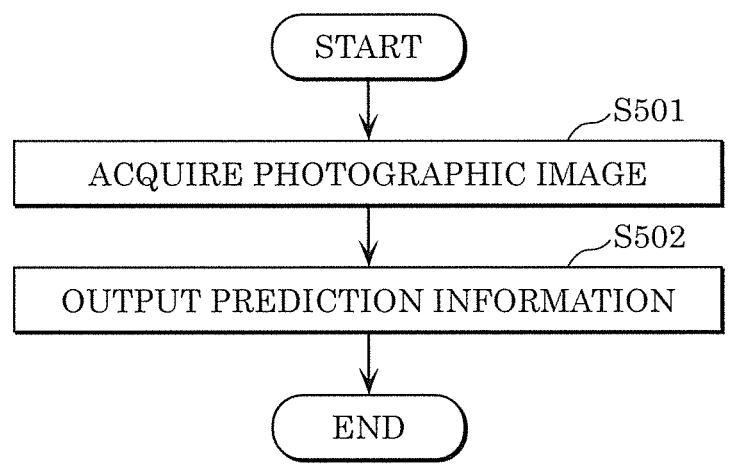
FIG. 16 is a flowchart illustrating a risk prediction method according to the variation of the embodiment.

FIG. 16 is a flowchart illustrating a risk prediction method according to the variation.

As shown in FIG. 16, the risk prediction method according to the variation acquires still image data or moving image data captured by an onboard sensor installed on a vehicle (S501), and outputs prediction information on occurrence of an event after time when the still image data or moving image data is captured, wherein the prediction information is output by entering the acquired still image data or moving image data as input data into the recognition model constructed by the above-described learning method (S502).

Figure 17:
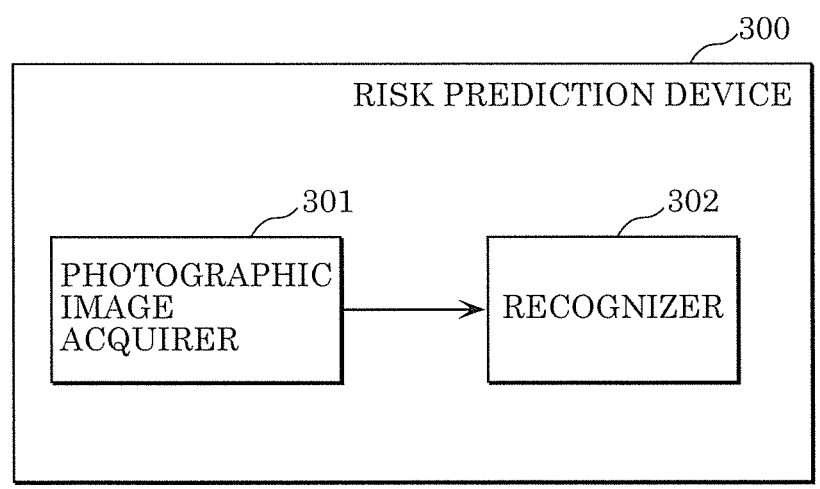
FIG. 17 is a block diagram illustrating a risk prediction device according to the variation of the embodiment.

FIG. 17 is a block diagram illustrating risk prediction device 300 according to the variation.

As shown in FIG. 17, risk prediction device 300 according to the variation includes photographic image acquirer 301 that acquires the still image data or moving image data captured by the onboard sensor installed on the vehicle and recognizes 302 that outputs the prediction information on occurrence of an event after time when the still image data or moving image data is captured, wherein the prediction information is output by entering the acquired still image data or moving image data as the input data into the recognition model constructed by above-described learning device 200.

It should be noted that in the foregoing exemplary embodiment, the respective structural components may be implemented using dedicated hardware or by execution of a software program suited to the respective structural components. The respective structural components may be implemented by way of a program executing unit such as a CPU or a processor reading out and executing a software program recorded on a recording medium such as a hard disk or a semiconductor memory. Here, the software for implementing the risk prediction device according to the above-described exemplary embodiment is a program as described below.

Specifically, this program causes a computer to execute a learning data creation method for creating, by a computer, learning data for risk prediction including positive data and negative data, the learning data creation method includes: acquiring one of items of still image data and items of moving image data as items of event data in each of which an event that is one of an accident and an incident appears and items of non-event data in each of which no event appears; presenting first data which is one of still image data and moving image data that is of a predetermined time before the event and included in one item of event data of the items of event data acquired; presenting one item of non-event data of the items of non-event data acquired, as second data; receiving a judgment result as to whether the first data and the second data are similar; and storing the event data and the non-event data in a storage device to create the learning data, wherein in the storing: (a) the event data is stored as the positive data; (b) the non-event data is stored as the positive data if the judgment result received indicates that the first data and the second data are similar; and (c) the non-event data is stored as the negative data if the judgment result received indicates that the first data and the second data are not similar.

Furthermore, the program causes a computer to execute a learning method for risk prediction by a risk prediction device, including: acquiring learning data created according to the learning data creation method according to claim 1; and learning features of the positive data and the negative data included in the learning data based on the learning data acquired, to construct a recognition model.

Furthermore, the program causes a computer to execute a risk prediction method including: acquiring one of still image data and moving image data captured by an onboard sensor installed on a vehicle; and outputting prediction information on occurrence of an event after time when the one of the still image data and the moving image data is captured, the prediction information being output by entering the one of the still image data and the moving image data acquired as input data into the recognition model constructed according to the above-described learning method.

Although a learning data creation method and the like according to one or more aspects have been described above based on the exemplary embodiment, the present disclosure is not limited to the embodiment. As long as not deviating from the essence of the present disclosure, forms obtained by applying various modifications to the exemplary embodiment conceivable by those skilled in the art, and forms obtained by combining constituents in different embodiments may be included in the one or more aspects.

INDUSTRIAL APPLICABILITY

The present disclosure can be used for a learning data creation method of creating learning data for appropriately predicting risk events including an accident or incident that will occur in the future. More specifically, it can be used for a control device or the like mounted on a self-driving vehicle.

What is claimed is:

1. A learning data creation method for creating, by a computer, learning data for risk prediction including positive data and negative data, the learning data creation method comprising:
   acquiring one of items of still image data and items of moving image data as items of event data in each of which an event that is one of an accident and an incident appears and items of non-event data in each of which no event appears;
   presenting first data which is one of still image data and moving image data that is of a predetermined time before the event and included in one item of event data of the items of event data acquired;
   presenting one item of non-event data of the items of non-event data acquired, as second data;
   receiving a judgment result as to whether the first data and the second data are similar; and
   storing the event data and the non-event data in a storage device to create the learning data, wherein
   in the storing:
   (a) the event data is stored as the positive data;
   (b) the non-event data is stored as the positive data if the judgment result received indicates that the first data and the second data are similar; and
   (c) the non-event data is stored as the negative data if the judgment result received indicates that the first data and the second data are not similar.

2. The learning data creation method according to claim 1, wherein
   the predetermined time is determined based on a reaction time which is a time from when a driver of a vehicle recognizes a danger to when the driver takes braking measures for the vehicle.

3. The learning data creation method according to claim 2, wherein
   the predetermined time is determined further based on a processing time of a risk prevention device that performs processing of the risk prediction.

4. The learning data creation method according to claim 1, wherein
   each of the items of event data is moving image data, and each of the items of non-event data is moving image data.

5. The learning data creation method according to claim 1, wherein
   the first data is moving image data.

6. The learning data creation method according to claim 1, wherein
   in the receiving,
   a judgment result as to whether an event actually appears in the event data is further received; and in the storing,
the event data is stored as the negative data if the judgment result received indicates that no event actually appears in the event data.

7. The learning data creation method according to claim 1, wherein
in the receiving,
a judgment result by image recognition processing as to whether the first data and the second data are similar is received.

8. The learning data creation method according to claim 7, wherein
the image recognition processing includes processing of recognizing at least one of a total number, a positional relationship, and an optical flow of moving bodies appearing in an image shown by the first data and the second data.

9. The learning data creation method according to claim 1, further comprising:
classifying each item of one of the items of still image data and the items of moving image data generated by photographing with an onboard sensor installed on a vehicle into one of event data and non-event data to acquire the items of event data and the items of non-event data, wherein
in the classifying,
if one of an event in which a body collides with the vehicle and an event in which a body suddenly comes close is recognized by image recognition processing when one item of one of the still image data and the moving image data is captured by the onboard sensor, the one item of the one of the still image data and the moving image data is classified into event data.

10. The learning data creation method according to claim 9, wherein
in the classifying,
if one of an event in which sudden braking is applied in the vehicle and an event in which sudden steering is performed in the vehicle is determined from acceleration data of the vehicle when the one item of the one of the still image data and the moving image data is captured by the onboard sensor, the one item of the one of the still image data and the moving image data is classified into event data.

11. The learning data creation method according to claim 9, wherein
in the classifying,
when the vehicle receives a danger signal by inter-vehicle communication even if one of an event in which sudden braking is applied in the vehicle and an event in which sudden steering is performed in the vehicle is determined, the one item of the one of the still image data and the moving image data is classified into non-event data.

12. The learning data creation method according to claim 9, wherein
the one item of the one of the still image data and the moving image data is one of wide-angle still image data and wide-angle moving image data in which a view ahead of the vehicle appears, and
in the classifying,
if it is determined from acceleration data of the vehicle that sudden braking is applied in the vehicle when the one of the wide-angle still image data and the wide-angle moving image data which is the one item of the one of the still image data and the moving image data is captured by the onboard sensor, one of still image data and moving image data in which the view ahead of the vehicle appears, out of the wide-angle still image data and the wide-angle moving image data, is classified into event data.

13. The learning data creation method according to claim 9, wherein
the one item of the one of the still image data and the moving image data is one of wide-angle still image data and wide-angle moving image data in which a view ahead of the vehicle appears, and
in the classifying,
if it is determined from acceleration data of the vehicle that sudden steering to one of left and right of the vehicle is performed when the wide-angle still image data and the wide-angle moving image data which is the one item of the one of the still image data and the moving image data is captured by the onboard sensor, one of still image data and moving image data in which the other of the left and right of the vehicle appears, out of the wide-angle still image data and the wide-angle moving image data, is classified into event data.

14. The learning data creation method according to claim 12, wherein
in the classifying,
a horizontal size of one of the still image data and the moving image data classified into the event data out of the wide-angle still image data and the wide-angle moving image data is determined based on speed of the vehicle when the one image is captured.

15. The learning data creation method according to claim 12, wherein
in the classifying,
a horizontal size of one of the still image data and the moving image data classified into the event data out of the wide-angle still image data and the wide-angle moving image data is smaller as speed of the vehicle when the one image is captured is higher.

16. The learning data creation method according to claim 1, wherein
in the presenting of the second data,
the one item of non-event data is preselected based on image recognition processing from the items of non-event data acquired to present the one item of non-event data selected.

17. A learning method for risk prediction by a risk prediction device, the learning method comprising:
acquiring learning data created according to the learning data creation method according to claim 1; and
learning features of the positive data and the negative data included in the learning data based on the learning data acquired, to construct a recognition model.

18. A risk prediction method, comprising:
acquiring one of still image data and moving image data captured by an onboard sensor installed on a vehicle; and
outputting prediction information on occurrence of an event after time when the one of the still image data and the moving image data is captured, the prediction information being output by entering the one of the still image data and the moving image data acquired as input data into the recognition model constructed according to the learning method according to claim 17.

19. A learning data creation device for creating, by a computer, learning data for risk prediction including positive data and negative data, the learning data creation device comprising:

a learning data acquirer that acquires one of items of still image data and items moving image data as items of event data in each of which an event that is one of an accident and an incident appears and items of non-event data in each of which no event appears; and an annotation provider that presents first data that is one of still image data and moving image data that is of a predetermined time before an event and included in one item of event data of the items of event data acquired, presents one item of non-event data of the items of non-event data acquired, as second data, receives a judgment result as to whether the first data and the second data are similar, and stores the first data and the second data in a storage device to create the learning data, wherein the annotation provider, during the storing, (a) stores the event data as the positive data, (b) stores the non-event data as the positive data if the judgment result received indicates that the first data and the second data are similar, and (c) stores the non-event data as the negative data if the judgment result received indicates that the first data and the second data are not similar.

20. A learning device for risk prediction by a risk prediction device, the learning device comprising:

a learning data acquirer that acquires learning data created by the learning data creation device according to claim 19; and a learner that learns features of each of the positive data and the negative data included in the learning data by using the learning data acquired, to construct a recognition model.

21. A risk prediction device, comprising:

a photographic image acquirer that acquires one of still image data and moving image data captured by an onboard sensor installed on a vehicle; and a recognizes that outputs prediction information on occurrence of an event after time when the one of the still image data and the moving image data is captured, the prediction information being output by entering the one of the still image data and the moving image data acquired, as input data, into the recognition model constructed by the learning device according to claim 20.

22. A non-transitory computer-readable recording medium having a computer program recorded thereon for causing a computer to execute the learning data creation method according to claim 1.

23. A non-transitory computer-readable recording medium having a computer program recorded thereon for causing a computer to execute the learning method according to claim 17.

24. A non-transitory computer-readable recording medium having a computer program recorded thereon for causing a computer to execute the risk prediction method according to claim 18.

* * * * *